(12) United States Patent
Jiao et al.

(10) Patent No.: US 12,245,216 B2
(45) Date of Patent: Mar. 4, 2025

(54) COMMUNICATION METHOD AND APPARATUS

(71) Applicant: HUAWEI TECHNOLOGIES CO., LTD., Guangdong (CN)

(72) Inventors: Shurong Jiao, Shanghai (CN); Meng Hua, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 351 days.

(21) Appl. No.: 17/935,920

(22) Filed: Sep. 27, 2022

(65) Prior Publication Data

US 2023/0014045 A1 Jan. 19, 2023

Related U.S. Application Data

(63) Continuation of application No. PCT/CN2021/082168, filed on Mar. 22, 2021.

(30) Foreign Application Priority Data

Apr. 10, 2020 (CN) .......................... 202010281404.8

(51) Int. Cl.
*H04W 72/121* (2023.01)
*H04W 72/1263* (2023.01)

(52) U.S. Cl.
CPC ..... *H04W 72/121* (2013.01); *H04W 72/1263* (2013.01)

(58) Field of Classification Search
CPC ........... H04W 72/121; H04W 72/1263; H04W 72/0453; H04W 72/23; H04W 72/0446; H04L 5/0023; H04L 5/0044
See application file for complete search history.

(56) References Cited

U.S. PATENT DOCUMENTS 9,525,466 B2   12/2016   Yum et al.
2019/0253200 A1*  8/2019  Salem ............... H04W 74/0808
(Continued)

FOREIGN PATENT DOCUMENTS

CN   110366246 A   10/2019
CN   110830190 A    2/2020
WO   2020069428 A1  4/2020

OTHER PUBLICATIONS

U.S. Appl. No. 62/867,153, filed Jun. 26, 2019 (Year: 2019).*
(Continued)

*Primary Examiner* — Sun Jong Kim

(57) ABSTRACT

This application relates to the field of communications technologies, and discloses a communication method and apparatus. The method includes: when a terminal device determines transmission statuses of N time-frequency resource groups based on transmission indication information sent by a network device, if a time-frequency resource group is separated into a former half and a latter half by one or more first symbols in time domain, the former half of the time-frequency resource group may be combined into a previous time-frequency resource group of the time-frequency resource group, or the latter half of the time-frequency resource group may be combined into a next time-frequency resource group of the time-frequency resource group, to determine a transmission status. This ensures continuity, in time domain, of the time-frequency resource group indicated by the transmission indication information, and can avoid unnecessary uplink transmission cancellation or downlink transmission interruption, thereby increasing a network capacity.

18 Claims, 14 Drawing Sheets

(56) References Cited

U.S. PATENT DOCUMENTS

2021/0314981 A1* 10/2021 Liang .................... H04W 72/23
2022/0353711 A1* 11/2022 Ying ................. H04W 72/1263

OTHER PUBLICATIONS

R1-2000359, ZTE, Remaining issues on UL inter-UE multiplexing between eMBB and URLLC, 3GPP TSG RAN WG1 #100, e-Meeting, Feb. 24-Mar. 6, 2020, 8 pages.

R1-2000972, Qualcomm, Remaining issues on uplink inter-UE multiplexing and prioritization, 3GPP TSG RAN WG1 #100 eMeeting, Feb. 24-Mar. 6, 2020, 5 pages.

* cited by examiner

COMMUNICATION METHOD AND APPARATUS

CROSS-REFERENCE TO RELATED APPLICATIONS

This application is a continuation of International Application No. PCT/CN2021/082168, filed on Mar. 22, 2021, which claims priority to Chinese Patent Application No. 202010281404.8, filed on Apr. 10, 2020. The disclosures of the aforementioned applications are hereby incorporated by reference in their entireties.

TECHNICAL FIELD

This application relates to the field of communications technologies, and in particular, to a communication method and apparatus.

BACKGROUND

Ultra-reliable and low-latency communications (URLLC) is one of three typical services of the $5^{th}$ generation (5G) mobile communication system, and main application scenarios of the ultra-reliable and low latency communications include self-driving, telemedicine, and the like. Stricter requirements on reliability and a latency are raised in these application scenarios. Requirements of the URLLC service are as follows: Data transmission reliability reaches 99.999%, a transmission latency is less than 1 ms, and signaling overheads are reduced as much as possible while requirements of high reliability and a low latency are met.

A new type of downlink control information (DCI) is introduced into URLLC, and is sent by using a DCI format 2_4. Such DCI can be used to indicate whether a terminal device cancels uplink transmission on a corresponding time-frequency resource, and therefore, may also be referred to as an uplink cancellation indication (CI). In this way, a time-frequency resource scheduled to a terminal device for uplink transmission may be canceled, and is granted to another terminal device that has a more urgent uplink transmission service.

However, in a time division duplex (TDD) system and the like, uplink and downlink symbols occur at different times, and a time-frequency resource for uplink transmission whose cancellation is indicated by using the uplink CI is separated by the downlink symbol in time domain. In other words, the time-frequency resource for uplink transmission whose cancellation is indicated by using the uplink CI crosses the downlink symbols in time domain. However, in practice, the URLLC service generally does not use a time-frequency resource that crosses several downlink symbols. Otherwise, uplink transmission that could have been performed is canceled. Consequently, a network capacity is reduced.

SUMMARY

Embodiments of this application provide a communication method and apparatus, to resolve a problem of unnecessary uplink transmission cancellation or downlink transmission interruption caused by discontinuity of a time-frequency resource (group) in time domain, to increase a network capacity.

According to a first aspect, an embodiment of this application provides a communication method. The method may be performed by a terminal device, and includes: The terminal device determines N time-frequency resource groups, where each of the N time-frequency resource groups includes at least one time-frequency resource, and N is a positive integer greater than or equal to 2; receives transmission indication information from a network device, where the transmission indication information includes a bit sequence used to indicate transmission statuses of the N time-frequency resource groups, N bit groups in the bit sequence are in a one-to-one correspondence with the N time-frequency resource groups, and each of the N bit groups includes at least one bit; and performs data transmission with the network device based on the transmission status of each of the N time-frequency resource groups, where when an $i^{th}$ time-frequency resource group among the N time-frequency resource groups is separated by M first symbols in time domain, where M is a positive integer, an $(i-1)^{th}$ bit group in the bit sequence indicates a transmission status of an $(i-1)^{th}$ time-frequency resource group and a transmission status of a time-frequency resource before the M first symbols in the $i^{th}$ time-frequency resource group, and an $i^{th}$ bit group in the bit sequence indicates a transmission status of a time-frequency resource after the M first symbols in the $i^{th}$ time-frequency resource group, where i is a positive integer greater than or equal to 2 and less than or equal to N, or an $i^{th}$ bit group in the bit sequence indicates a transmission status of a time-frequency resource before the M first symbols in the $i^{th}$ time-frequency resource group, and an $(i+1)^{th}$ bit group in the bit sequence indicates a transmission status of a time-frequency resource after the M first symbols in the $i^{th}$ time-frequency resource group and a transmission status of an $(i+1)^{th}$ time-frequency resource group, where i is a positive integer less than or equal to N−1.

In this embodiment of this application, the transmission indication information may be used to cancel uplink transmission or downlink transmission. When the transmission indication information is used to cancel uplink transmission, the transmission indication information may be an uplink cancellation indication used to indicate whether the terminal device cancels uplink transmission on a corresponding time-frequency resource. In this case, a determined time-frequency resource group usually includes only an uplink symbol, and a first symbol separating the time-frequency resource group in time domain is generally a downlink symbol. When the transmission indication information is used to cancel downlink transmission, the transmission indication information may be a downlink interrupted transmission indication used to indicate whether the terminal device has downlink transmission on a corresponding time-frequency resource. In this case, a determined time-frequency resource group usually includes only a downlink symbol, and a first symbol separating the time-frequency resource group in time domain is generally an uplink symbol.

In the foregoing method, when a time-frequency resource group is separated into a former half and a latter half by a first symbol in time domain, the former half of the time-frequency resource group may be combined into a previous time-frequency resource group of the time-frequency resource group, or the latter half of the time-frequency resource group may be combined into a next time-frequency resource group of the time-frequency resource group, to determine a transmission status, so that continuity, in time domain, of the time-frequency resource group indicated by the transmission indication information is ensured, unnecessary uplink transmission cancellation or downlink transmission interruption can be avoided, and a network capacity is increased.

In an embodiment, when a quantity of symbols of the $i^{th}$ time-frequency resource group that are before the M first symbols is less than a quantity of symbols of the $i^{th}$ time-frequency resource group that are after the M first symbols, the $(i-1)^{th}$ bit group in the bit sequence indicates the transmission status of the $(i-1)^{th}$ time-frequency resource group and the transmission status of the time-frequency resource before the M first symbols in the $i^{th}$ time-frequency resource group, and the $i^{th}$ bit group in the bit sequence indicates the transmission status of the time-frequency resource after the M first symbols in the $i^{th}$ time-frequency resource group, where i is a positive integer greater than or equal to 2 and less than or equal to N; or when a quantity of symbols of the $i^{th}$ time-frequency resource group that are before the M first symbols is greater than or equal to a quantity of symbols of the $i^{th}$ time-frequency resource group that are after the M first symbols, the $i^{th}$ bit group in the bit sequence indicates the transmission status of the time-frequency resource before the M first symbols in the $i^{th}$ time-frequency resource group, and the $(i+1)^{th}$ bit group in the bit sequence indicates the transmission status of the time-frequency resource after the M first symbols in the $i^{th}$ time-frequency resource group and the transmission status of the $(i+1)^{th}$ time-frequency resource group, where i is a positive integer less than or equal to N−1.

In the foregoing design, when a time-frequency resource group is separated into a former half and a latter half by M first symbols in time domain, a half in which a quantity of included symbols is relatively small may be selected based on quantities of symbols respectively included in the former half and the latter half of the time-frequency resource group, and is combined into a time-frequency resource group adjacent to the half, to determine a transmission status, thereby facilitating ensuring continuity, in time domain, of the time-frequency resource group indicated by the transmission indication information, and avoiding unnecessary uplink transmission cancellation or downlink transmission interruption.

In an embodiment, when a quantity of symbols of the $i^{th}$ time-frequency resource group that are before the M first symbols is one or two, the $(i-1)^{th}$ bit group in the bit sequence indicates the transmission status of the $(i-1)^{th}$ time-frequency resource group and the transmission status of the time-frequency resource before the M first symbols in the $i^{th}$ time-frequency resource group, and the $i^{th}$ bit group in the bit sequence indicates the transmission status of the time-frequency resource after the M first symbols in the $i^{th}$ time-frequency resource group, where i is a positive integer greater than or equal to 2 and less than or equal to N. Alternatively, when a quantity of symbols of the $i^{th}$ time-frequency resource group that are after the M first symbols is one or two, the $i^{th}$ bit group in the bit sequence indicates the transmission status of the time-frequency resource before the M first symbols in the $i^{th}$ time-frequency resource group, and the $(i+1)^{th}$ bit group in the bit sequence indicates the transmission status of the time-frequency resource after the M first symbols in the $i^{th}$ time-frequency resource group and the transmission status of the $(i+1)^{th}$ time-frequency resource group, where i is a positive integer less than or equal to N−1.

In the foregoing design, when a time-frequency resource group is separated into a former half and a latter half by M first symbols in time domain, a half in which a quantity of included symbols conforms to a combination quantity (such as one or two) may be selected based on quantities of symbols respectively included in the former half and the latter half of the time-frequency resource group, and is combined into a time-frequency resource group adjacent to the half, to determine a transmission status, thereby facilitating ensuring continuity, in time domain, of the time-frequency resource group indicated by the transmission indication information, and avoiding unnecessary uplink transmission cancellation or downlink transmission interruption.

In an embodiment, when the $i^{th}$ time-frequency resource group is a time-frequency resource group with a headmost time domain location among the N time-frequency resource groups, the $i^{th}$ bit group in the bit sequence indicates the transmission status of the time-frequency resource before the M first symbols in the $i^{th}$ time-frequency resource group, and the $(i+1)^{th}$ bit group in the bit sequence indicates the transmission status of the time-frequency resource after the M first symbols in the $i^{th}$ time-frequency resource group and the transmission status of the $(i+1)^{th}$ time-frequency resource group.

In the foregoing design, specially, when a time-frequency resource group separated by M first symbols in time domain is the first time-frequency resource group among the N time-frequency resource groups in time domain, a latter half of the time-frequency resource group may be combined into the second time-frequency resource group in time domain, to determine a transmission status, to ensure continuity, in time domain, of the time-frequency resource group indicated by the transmission indication information.

In an embodiment, when the time domain location of the $i^{th}$ time-frequency resource group is a time-frequency resource group with a rearmost time domain location among the N time-frequency resource groups, the $(i-1)^{th}$ bit group in the bit sequence indicates the transmission status of the $(i-1)^{th}$ time-frequency resource group and the transmission status of the time-frequency resource before the M first symbols in the $i^{th}$ time-frequency resource group, and the $i^{th}$ bit group in the bit sequence indicates the transmission status of the time-frequency resource after the M first symbols in the $i^{th}$ time-frequency resource group.

In the foregoing design, specially, when a time-frequency resource group separated by M first symbols in time domain is the last time-frequency resource group among the N time-frequency resource groups in time domain, a former half of the time-frequency resource group may be combined into the penultimate time-frequency resource group in time domain, to determine a transmission status, to ensure continuity, in time domain, of the time-frequency resource group indicated by the transmission indication information.

In an embodiment, only when M is greater than or equal to a first threshold, a former half or a latter half of a time-frequency resource group separated by a first symbol in time domain can be combined into an adjacent time-frequency resource group, to determine a transmission status.

In the foregoing design, when the time-frequency resource group occurs in time domain and is separated by M downlink symbols, if a quantity of the downlink symbols for separation is relatively small, the transmission status of the time-frequency resource before the M downlink symbols in the time-frequency resource group is usually consistent with the transmission status of the time-frequency resource after the M downlink symbols. When M is less than or equal to the first threshold, the former half or the latter half of the time-frequency resource group separated by the first symbol in time domain may not be combined into the adjacent time-frequency resource group, thereby facilitating reduction of a calculation quantity.

In an embodiment, the method further includes: The terminal device receives data scheduling information from the network device, where the data scheduling information indicates a first time-frequency resource for data transmission; and the performing data transmission with the network device based on the transmission status of each of the N time-frequency resource groups includes: performing data transmission with the network device based on the transmission status of each of the N time-frequency resource groups and the first time-frequency resource.

In the foregoing design, the terminal device may perform data transmission with the network device based on a transmission status of a time-frequency resource after adjustment, thereby facilitating increasing a network capacity.

According to a second aspect, an embodiment of this application provides a communication method. The method may be performed by a network device, and includes: The network device determines N time-frequency resource groups, where each of the N time-frequency resource groups includes at least one time-frequency resource, and N is a positive integer greater than or equal to 2; sends transmission indication information to a terminal device, where the transmission indication information includes a bit sequence used to indicate transmission statuses of the N time-frequency resource groups, N bit groups in the bit sequence are in a one-to-one correspondence with the N time-frequency resource groups, and each of the N bit groups includes at least one bit; and performs data transmission with the terminal device based on the transmission status of each of the N time-frequency resource groups, where when an $i^{th}$ time-frequency resource group among the N time-frequency resource groups is separated by M first symbols in time domain, where M is a positive integer, an $(i-1)^{th}$ bit group in the bit sequence indicates a transmission status of an $(i-1)^{th}$ time-frequency resource group and a transmission status of a time-frequency resource before the M first symbols in the $i^{th}$ time-frequency resource group, and an $i^{th}$ bit group in the bit sequence indicates a transmission status of a time-frequency resource after the M first symbols in the $i^{th}$ time-frequency resource group, where i is a positive integer greater than or equal to 2 and less than or equal to N, or an $i^{th}$ bit group in the bit sequence indicates a transmission status of a time-frequency resource before the M first symbols in the $i^{th}$ time-frequency resource group, and an $(i+1)^{th}$ bit group in the bit sequence indicates a transmission status of a time-frequency resource after the M first symbols in the $i^{th}$ time-frequency resource group and a transmission status of an $(i+1)^{th}$ time-frequency resource group, where i is a positive integer less than or equal to N−1.

In this embodiment of this application, the transmission indication information may be used to cancel uplink transmission or downlink transmission. When the transmission indication information is used to cancel uplink transmission, the transmission indication information may be an uplink cancellation indication used to indicate whether the terminal device cancels uplink transmission on a corresponding time-frequency resource. In this case, a determined time-frequency resource group usually includes only an uplink symbol, and a first symbol separating the time-frequency resource group in time domain is generally a downlink symbol. When the transmission indication information is used to cancel downlink transmission, the transmission indication information may be a downlink interrupted transmission indication used to indicate whether the terminal device has downlink transmission on a corresponding time-frequency resource. In this case, a determined time-frequency resource group usually includes only a downlink symbol, and a first symbol separating the time-frequency resource group in time domain is generally an uplink symbol.

In an embodiment, when a quantity of symbols of the $i^{th}$ time-frequency resource group that are before the M first symbols is less than a quantity of symbols of the $i^{th}$ time-frequency resource group that are after the M first symbols, the $(i-1)^{th}$ bit group in the bit sequence indicates the transmission status of the $(i-1)^{th}$ time-frequency resource group and the transmission status of the time-frequency resource before the M first symbols in the $i^{th}$ time-frequency resource group, and the $i^{th}$ bit group in the bit sequence indicates the transmission status of the time-frequency resource after the M first symbols in the $i^{th}$ time-frequency resource group, where i is a positive integer greater than or equal to 2 and less than or equal to N; or when a quantity of symbols of the $i^{th}$ time-frequency resource group that are before the M first symbols is greater than or equal to a quantity of symbols of the $i^{th}$ time-frequency resource group that are after the M first symbols, the $i^{th}$ bit group in the bit sequence indicates the transmission status of the time-frequency resource before the M first symbols in the $i^{th}$ time-frequency resource group, and the $(i+1)^{th}$ bit group in the bit sequence indicates the transmission status of the time-frequency resource after the M first symbols in the $i^{th}$ time-frequency resource group and the transmission status of the $(i+1)^{th}$ time-frequency resource group, where i is a positive integer less than or equal to N−1.

In an embodiment, when a quantity of symbols of the $i^{th}$ time-frequency resource group that are before the M first symbols is one or two, the $(i-1)^{th}$ bit group in the bit sequence indicates the transmission status of the $(i-1)^{th}$ time-frequency resource group and the transmission status of the time-frequency resource before the M first symbols in the $i^{th}$ time-frequency resource group, and the $i^{th}$ bit group in the bit sequence indicates the transmission status of the time-frequency resource after the M first symbols in the $i^{th}$ time-frequency resource group, where i is a positive integer greater than or equal to 2 and less than or equal to N. Alternatively, when a quantity of symbols of the $i^{th}$ time-frequency resource group that are after the M first symbols is one or two, the $i^{th}$ bit group in the bit sequence indicates the transmission status of the time-frequency resource before the M first symbols in the $i^{th}$ time-frequency resource group, and the $(i+1)^{th}$ bit group in the bit sequence indicates the transmission status of the time-frequency resource after the M first symbols in the $i^{th}$ time-frequency resource group and the transmission status of the $(i+1)^{th}$ time-frequency resource group, where i is a positive integer less than or equal to N−1.

In an embodiment, when a time domain location of the $i^{th}$ time-frequency resource group is a time-frequency resource group with a headmost time domain location among the N time-frequency resource groups, the $i^{th}$ bit group in the bit sequence indicates the transmission status of the time-frequency resource before the M first symbols in the $i^{th}$ time-frequency resource group, and the $(i+1)^{t}$ bit group in the bit sequence indicates the transmission status of the time-frequency resource after the M first symbols in the $i^{th}$ time-frequency resource group and the transmission status of the $(i+1)^{th}$ time-frequency resource group.

In an embodiment, when the time domain location of the $i^{th}$ time-frequency resource group is a time-frequency resource group with a rearmost time domain location among the N time-frequency resource groups, the $(i-1)^{th}$ bit group in the bit sequence indicates the transmission status of the $(i-1)^{th}$ time-frequency resource group and the transmission status of the time-frequency resource before the M first symbols in the $i^{th}$ time-frequency resource group, and the $i^{th}$ bit group in the bit sequence indicates the transmission status of the time-frequency resource after the M first symbols in the $i^{th}$ time-frequency resource group.

In an embodiment, only when M is greater than or equal to a first threshold, a former half or a latter half of a time-frequency resource group separated by a first symbol in time domain can be combined into an adjacent time-frequency resource group, to indicate a transmission status.

In an embodiment, the method further includes: The network device sends data scheduling information to the terminal device, where the data scheduling information indicates a first time-frequency resource for data transmission; and the performing data transmission with the terminal device based on the transmission status of each of the N time-frequency resource groups includes: performing data transmission with the terminal device based on the transmission status of each of the N time-frequency resource groups and the first time-frequency resource.

For beneficial effects of the various designs of the second aspect, refer to the descriptions corresponding to the terminal device side. Details are not described herein again.

According to a third aspect, an embodiment of this application provides a communication apparatus. The apparatus has a function of implementing the method in any one of the first aspect or the designs of the first aspect. The function may be implemented by hardware, or may be implemented by hardware executing corresponding software. The hardware or software includes one or more units (modules) corresponding to the foregoing function, for example, includes a transceiver unit and a processing unit.

In an embodiment, the apparatus may be a chip or an integrated circuit.

In an embodiment, the apparatus includes a processor and an interface circuit. The processor and the interface circuit are coupled, and are configured to implement the function of the method in any one of the first aspect or the designs of the first aspect. It may be understood that the interface circuit may be a transceiver or an input/output interface. The apparatus may further include a memory. The memory stores a program that can be executed by the processor and that is used to implement the function of the method in any one of the first aspect or the designs of the first aspect.

In an embodiment, the apparatus may be a terminal device.

According to a fourth aspect, an embodiment of this application provides a communication apparatus. The apparatus has a function of implementing the method in any one of the second aspect or the designs of the second aspect. The function may be implemented by hardware, or may be implemented by hardware executing corresponding software. The hardware or software includes one or more units (modules) corresponding to the foregoing function, for example, includes a transceiver unit and a processing unit.

In an embodiment, the apparatus may be a chip or an integrated circuit.

In an embodiment, the apparatus includes a processor and an interface circuit. The processor and the interface circuit are coupled, and are configured to implement the function of the method in any one of the second aspect or the designs of the second aspect. It may be understood that the interface circuit may be a transceiver or an input/output interface. The apparatus may further include a memory. The memory stores a program that can be executed by the processor and that is used to implement the function of the method in any one of the second aspect or the designs of the second aspect.

In an embodiment, the apparatus may be a network device.

According to a fifth aspect, an embodiment of this application provides a communication system. The communication system may include a network device and a terminal device. The terminal device may perform the method in any one of the first aspect or the designs of the first aspect. The network device may perform the method in any one of the second aspect or the designs of the second aspect.

According to a sixth aspect, an embodiment of this application provides a computer readable storage medium. The computer readable storage medium stores a computer program or instructions. When the computer program or the instructions are executed by a communication apparatus, the communication apparatus is enabled to perform the method in any one of the first aspect or the designs of the first aspect, or perform the method in any one of the second aspect or the designs of the second aspect.

According to a seventh aspect, an embodiment of this application further provides a computer program product, including a computer program or instructions. When the computer program or the instructions are executed by a communication apparatus, the method in any one of the first aspect or the designs of the first aspect may be implemented, or the method in any one of the second aspect or the designs of the second aspect may be implemented.

According to an eighth aspect, this application further provides a chip. The chip is configured to: implement the method in any one of the first aspect or the designs of the first aspect, or implement the method in any one of the second aspect or the designs of the second aspect.

For technical effects that can be achieved in the third aspect to the eighth aspect, refer to the technical effects that can be achieved in the first aspect and the second aspect. Details are not described herein again.

DESCRIPTION OF EMBODIMENTS

Technical solutions in embodiments of this application may be applied to various communication systems, for example, a long term evolution (LTE) system, an LTE time division duplex (TDD) system, a $5^{th}$ generation (5G) mobile communication system, or a new radio (NR) system, or may be applied to a future communication system or another similar communication system, such as a 6G system. A structure of the communication system to which the embodiments of this application are applied may be shown in FIG. 1, and the communication system includes a network device and at least one terminal device (such as terminal devices 1 to 6 shown in FIG. 1). The network device can communicate with the at least one terminal device (for example, the terminal device 1) by using an uplink (UL) and a downlink (DL).

Figure 1:
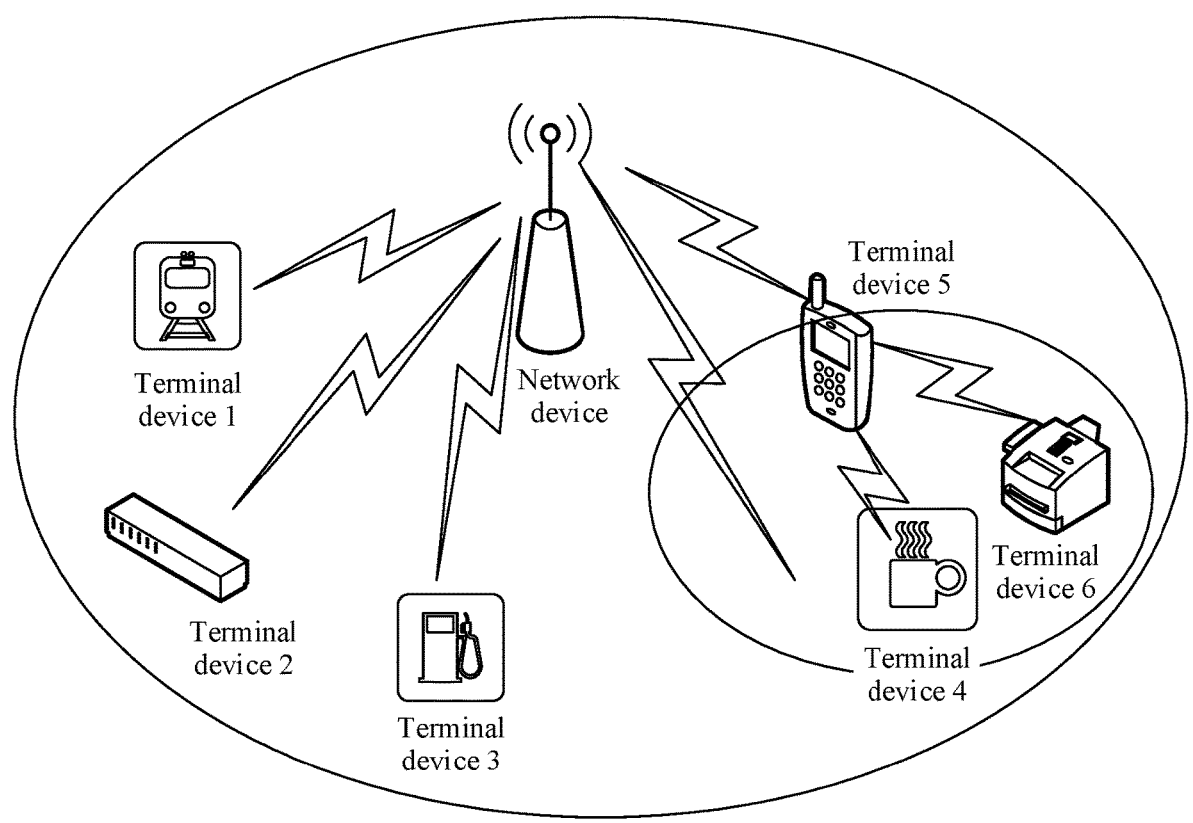
FIG. 1 is a diagram of a network architecture of a communication system to which an embodiment of this application is applicable.

It should be understood that a plurality of network devices may alternatively exist in the communication system, and one network device may provide a service for a plurality of terminal devices. Both a quantity of network devices and a quantity of terminal devices included in the communication system are not limited in the embodiments of this application. The network device and each of some or all terminal devices among the at least one terminal device in FIG. 1 may implement the technical solutions provided in the embodiments of this application. In addition, various terminal devices shown in FIG. 1 are merely some examples of the terminal device. It should be understood that the terminal device in the embodiments of this application is not limited thereto.

For ease of understanding by a person skilled in the art, the following explains and describes some terms in the embodiments of this application.

(1) A terminal device is a device with a wireless transceiver function, and may be deployed on land, including being indoors or outdoors, handheld, wearable, or in-vehicle, may be deployed on a water surface (for example, on a ship), or may be deployed in the air (for example, on a plane, on a balloon, or on a satellite). The terminal device may communicate with a core network through a radio access network (RAN), and exchange a voice and/or data with the RAN. The terminal device may be a mobile phone, a tablet computer, a computer with a wireless transceiver function, a mobile Internet device, a wearable device, a virtual reality terminal device, an augmented reality terminal device, a wireless terminal for industrial control, a wireless terminal for unmanned driving, a wireless terminal in telemedicine, a wireless terminal in a smart grid, a wireless terminal in transportation security, a wireless terminal in a smart city, a wireless terminal in a smart home, or the like. Application scenarios are not limited in the embodiments of this application. The terminal device may also be referred to as user equipment (UE), a mobile station, a remote station, or the like. A technology, a device form, and a name that are used by the terminal device are not limited in the embodiments of this application.

As an example instead of a limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not merely a hardware device, but is used to implement a powerful function through software support, data interaction, and cloud interaction. In a board sense, wearable intelligent devices include full-featured and large-sized devices that can implement complete or partial functions without depending on smartphones, for example, smart watches or smart glasses, and devices that focus on only one type of application function and need to work with other devices such as smartphones, such as various smart bands, smart helmets, or smart jewelry for monitoring physical signs.

Alternatively, the terminal device in the embodiments of this application may be an in-vehicle module, an in-vehicle component, an in-vehicle chip, or an in-vehicle unit that is built into a vehicle as one or more components or units. The vehicle may implement the method in this application by using the built-in in-vehicle module, in-vehicle component, in-vehicle chip, or in-vehicle unit.

(2) A network device, also referred to as an access network device, is a device that is in a network and that is configured to connect a terminal device to a wireless network. The network device may be a node in a radio access network, may be referred to as a base station, or may be referred to as a RAN node (or device). The network device may be an evolved NodeB (eNodeB) in an LTE system or an LTE-advanced system (LTE-A), may be a next generation NodeB (gNodeB) in a 5G NR system, may be a transmission reception point (TRP), a baseband unit (BBU), a Wi-Fi access point (AP), or the like, or may be a central unit (CU) and a distributed unit (DU). This is not limited in the embodiments of this application. In a separate deployment scenario in which the access network device includes the CU and the DU, the CU supports radio resource control (RRC), a packet data convergence protocol (PDCP), a service data adaptation protocol (SDAP), and the like. The DU mainly supports a radio link control (RLC) layer protocol, a medium access control (MAC) layer protocol, and a physical layer protocol.

(3) Transmission indication information. In the embodiments of this application, the transmission indication information is downlink control information (DCI), and may be an uplink cancellation indication used to indicate whether the terminal device cancels uplink transmission on a corresponding time-frequency resource, or may be a downlink interrupted transmission indication (INT) used to indicate whether the terminal device performs downlink transmission on a corresponding time-frequency resource. The network device may send the transmission indication information to the terminal device through a downlink control channel, for example, a physical downlink control channel (PDCCH). Either of the uplink cancellation indication (UL CI) and the downlink interrupted transmission indication (DL INT) may include a bit sequence used to indicate a transmission status of a time-frequency resource. The transmission status corresponding to the uplink cancellation indication is whether to cancel uplink transmission, and the transmission status corresponding to the downlink interrupted transmission indication is whether there is downlink transmission. Different from an $i^{th}$ bit, in a bit sequence included in the uplink cancellation indication, indicating whether to cancel uplink transmission of the terminal device on an $i^{th}$ time-frequency resource (a time-frequency resource corresponding to the $i^{th}$ bit), an $i^{th}$ bit in a bit sequence included in the corresponding downlink interrupted transmission indication indicates whether there is downlink transmission of the terminal device on the time-frequency resource of the $i^{th}$ time-frequency resource. After receiving the downlink interrupted transmission indication, if the terminal device determines that there is no downlink transmission of the terminal device on the $i^{th}$ time-frequency resource, receiving on the $i^{th}$ time-frequency resource may be stopped (when the DL INT is sent before the $i^{th}$ time-frequency resource). Alternatively, data corresponding to the $i^{th}$ time-frequency resource may be discarded from received data, or data corresponding to the $i^{th}$ time-frequency resource may be partially set to zero (when the DL INT is sent after the $i^{th}$ time-frequency resource).

The following describes in detail the embodiments of this application with reference to the accompanying drawings.

Embodiment 1

Figure 2:
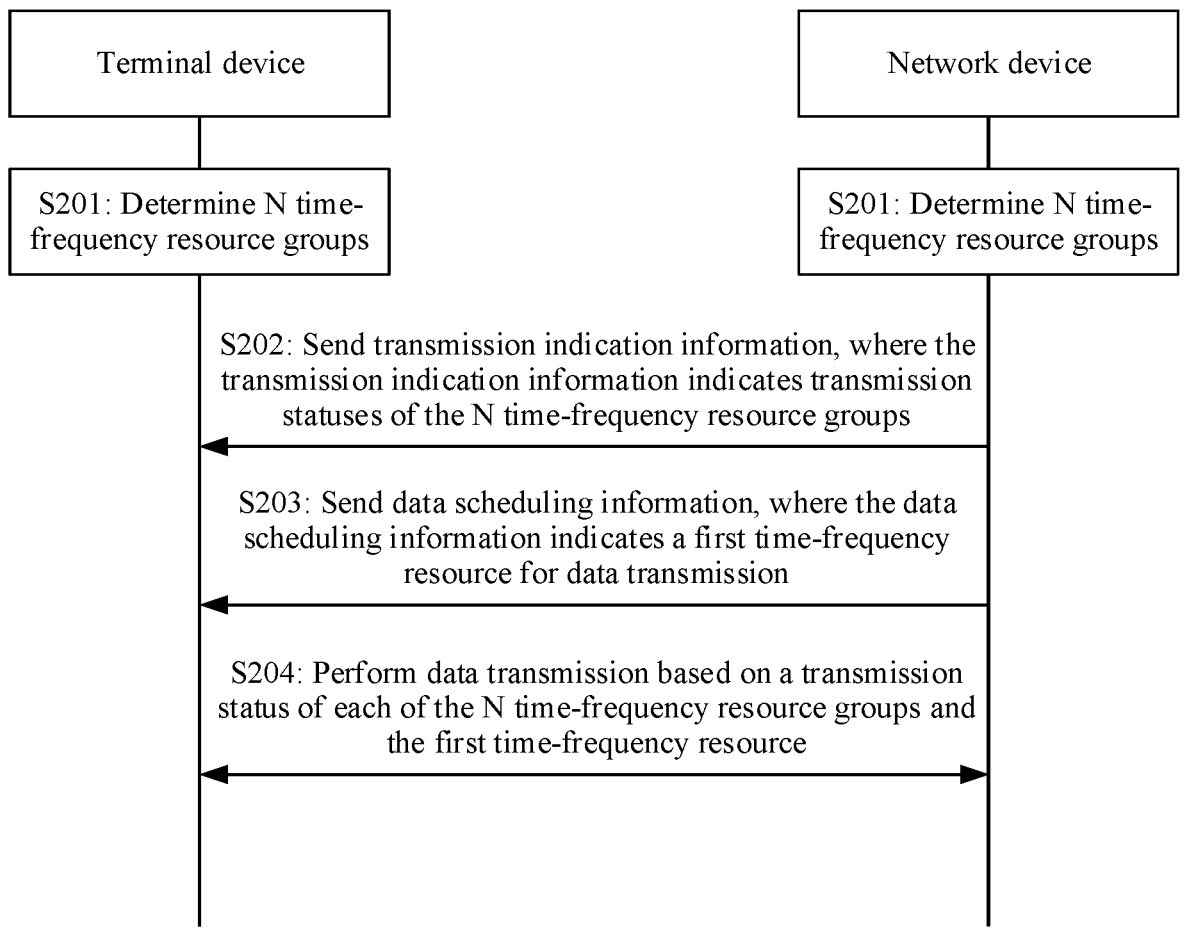
FIG. 2 is a diagram of a communication process according to an embodiment of this application.

FIG. 2 is a diagram of a communication process according to an embodiment of this application. The process includes the following steps.

S201: A network device and a terminal device determine N time-frequency resource groups, where each of the N time-frequency resource groups includes at least one time-frequency resource, and N is a positive integer greater than or equal to 2.

The network device may send higher layer signaling to the terminal device for configuring the N time-frequency resource groups.

In this embodiment of this application, the network device may configure, for the terminal device by using the higher layer signaling (for example, RRC signaling), a time-frequency resource region indicated by transmission indication information (such as an uplink cancellation indication or a downlink interrupted transmission indication).

An example in which the network device configures, for the terminal device by using the higher layer signaling (for example, timeFrequencyRegion), a time-frequency resource region indicated by the uplink cancellation indication is used. The network device may configure a quantity Bci of physical resource blocks (PRB) based on a frequencyRegionforCI parameter in timeFrequencyRegion, and configure a quantity $T_{CI}$ of orthogonal frequency division multiplexing (OFDM) symbols based on a timeDurationforCI parameter in timeFrequencyRegion. It should be noted that, in this embodiment of this application, the OFDM symbol may be referred to as a symbol.

Figure 3:
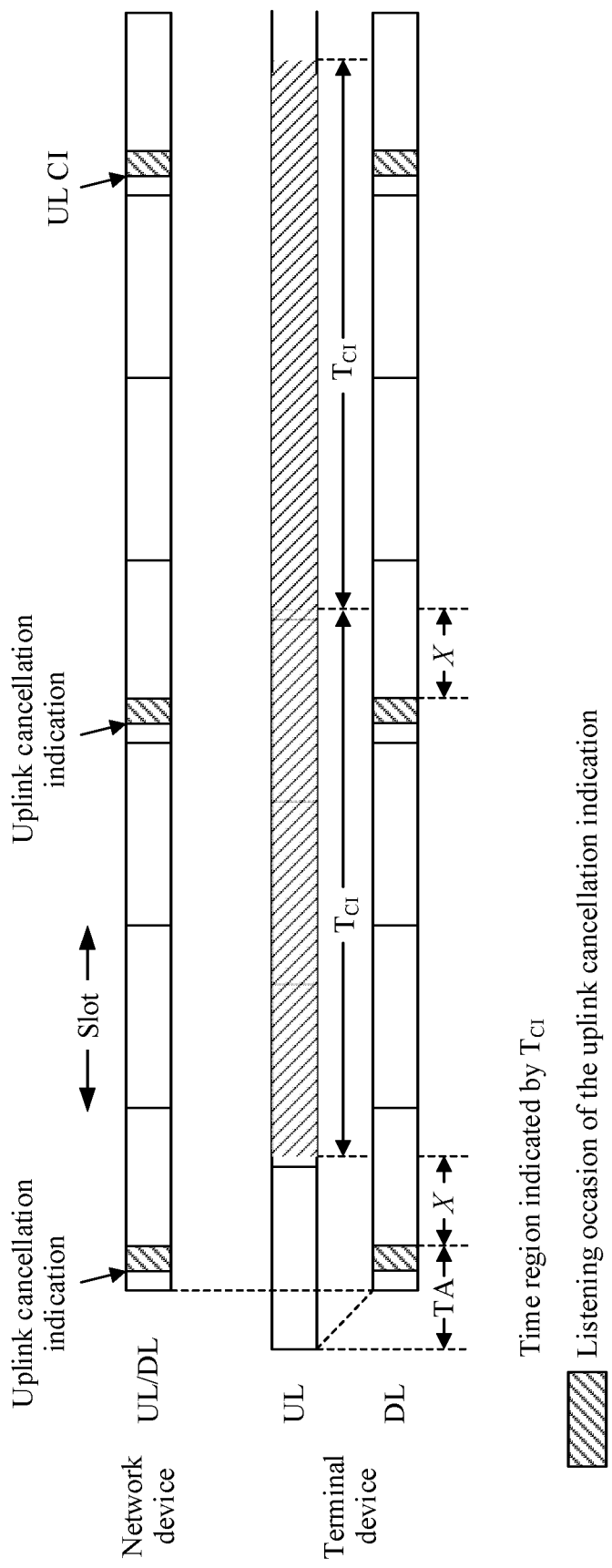
FIG. 3 is a diagram 1 of a monitoring occasion of an uplink cancellation indication according to an embodiment of this application.

If a monitoring cycle of the uplink cancellation indication is longer than one slot, or a monitoring cycle of the uplink cancellation indication is equal to one slot and there is only one monitoring occasion in one slot, there is only one monitoring occasion at most of the uplink cancellation indication in each slot. In this case, a time region indicated by $T_{CI}$ is equal to the monitoring cycle of the uplink cancellation indication, and may be equal to one slot, or may be longer than one slot. As shown in FIG. 3, in FDD, the monitoring cycle of the uplink cancellation indication is longer than one slot and there is only one monitoring occasion in one slot, and a time region indicated by $T_{CI}$ is equal to the monitoring cycle of the uplink cancellation indication, and is longer than one slot.

Figure 4:
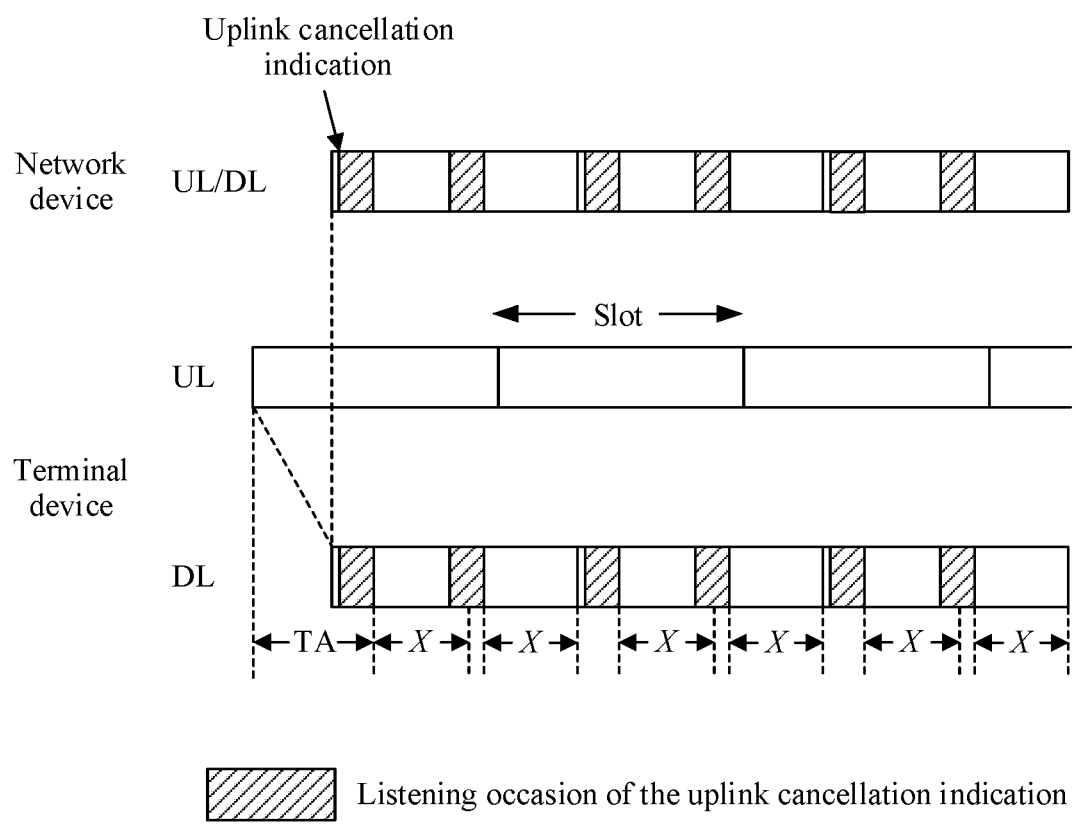
FIG. 4 is a diagram 2 of a monitoring occasion of an uplink cancellation indication according to an embodiment of this application.

If the monitoring cycle of the uplink cancellation indication is equal to one slot and there is more than one monitoring occasion in one slot, a quantity of monitoring occasion of the uplink cancellation indication in one slot may be greater than 1. In this case, a time region indicated by $T_{CI}$ may be not longer than one slot, a value of $T_{CI}$ may be one value in a set $\{2, 4, 7, 14\}$, and a unit is a symbol. As shown in FIG. 4, in FDD, the monitoring cycle of the uplink cancellation indication is equal to one slot and there is more than one monitoring occasion in one slot, and a time region indicated by $T_{CI}$ may be less than a quantity of symbols corresponding to one slot. In FIG. 3 and FIG. 4, TA may represent time alignment, for example, may be a timing advance, and is used for downlink and uplink time alignment. X represents an effective time of the uplink cancellation indication, that is, a time interval between a time when the terminal device receives the uplink cancellation indication (or the monitoring occasion) and a time-frequency resource indicated by the uplink cancellation indication. Alternatively, X may be understood as a time interval between an end symbol of the uplink cancellation indication (or the monitoring occasion) and a start symbol of a time-frequency resource indicated by the uplink cancellation indication.

The network device may further configure, for the terminal device by using the higher layer signaling (for example, CI-PayloadSize), a quantity X of bits included in a bit sequence in the uplink cancellation indication, a value of X may be one value in a set $\{1, 2, 4, 5, 7, 8, 10, 14, 16, 20, 25, 28, 32, 35, 56, 112\}$, and a unit is a bit.

Based on the foregoing configuration, one time-frequency resource region may be indicated for a monitoring occasion of each uplink cancellation indication of the terminal device. For example, a time-frequency resource region indicated for a monitoring occasion 1 of the uplink cancellation indication includes, in time domain, $T_{CI}$ symbols starting from the first symbol after the effective time of the uplink cancellation indication and after the monitoring occasion 1 of the uplink cancellation indication, and includes Bci PRBs in frequency domain. The effective time of the uplink cancellation indication may be represented as T, and a value of T is correlated with a time $T_{proc,2}$ corresponding to a processing capability 2 of a physical uplink shared channel (PUSCH).

Further, the network device may further configure, based on a timeGranularityforCI parameter in timeFrequencyRegion, a quantity $G_{CI}$ of groups into which the $T_{CI}$ symbols are grouped. A value of $G_{CI}$ may be a value in a set $\{1, 2, 4, 7, 14, 28\}$. Correspondingly, a quantity $N_{BI}$ of groups into which the $B_{CI}$ PRBs are grouped can be determined based on the quantity X of bits included in the bit sequence in the uplink cancellation indication and the quantity $G_{CI}$ of groups into which the $T_{CI}$ symbols in time domain are grouped, and $N_{BI}=X/G_{CI}$.

Figure 5:
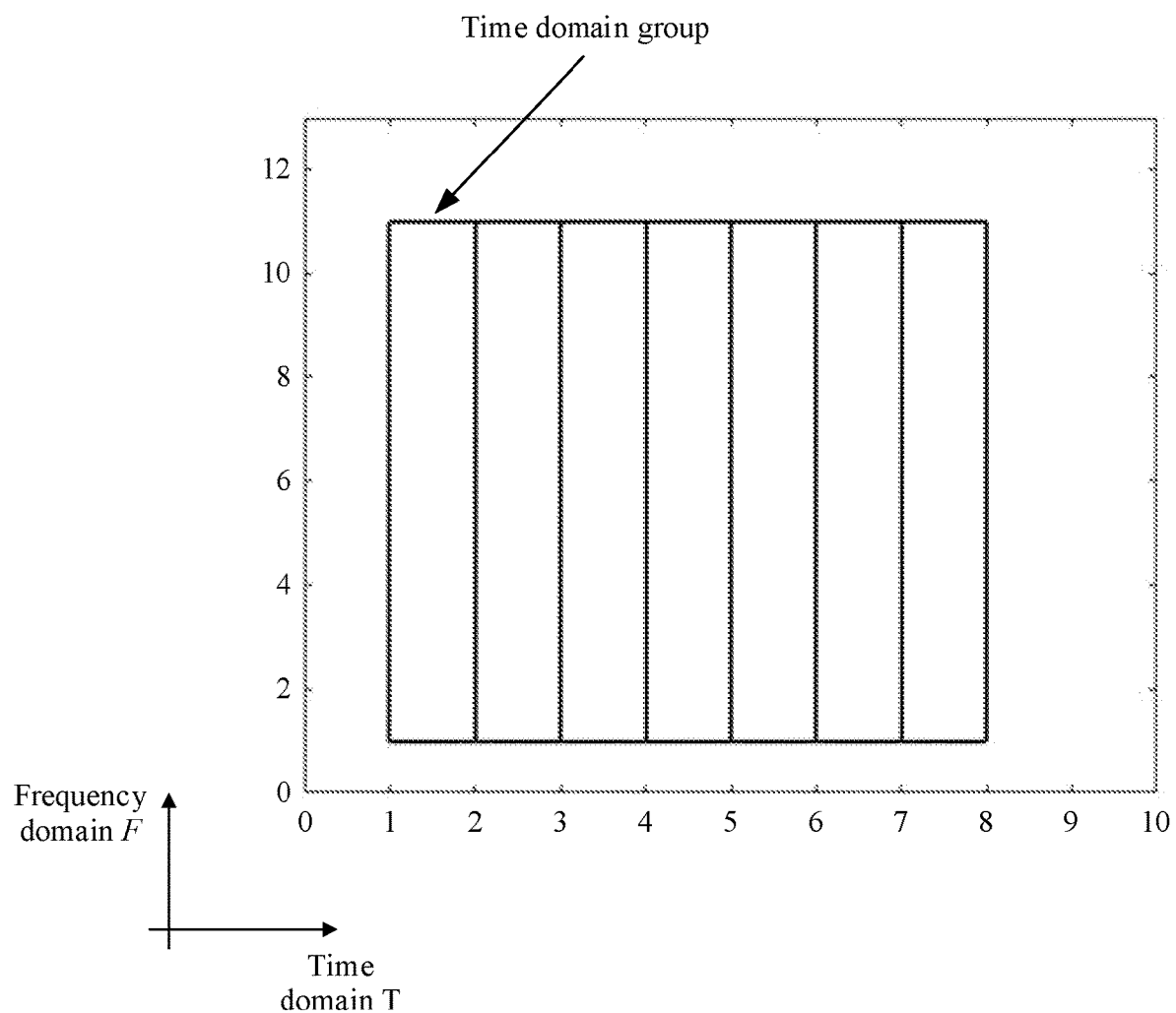
FIG. 5 is a diagram of a time domain group according to an embodiment of this application.
Figure 6:
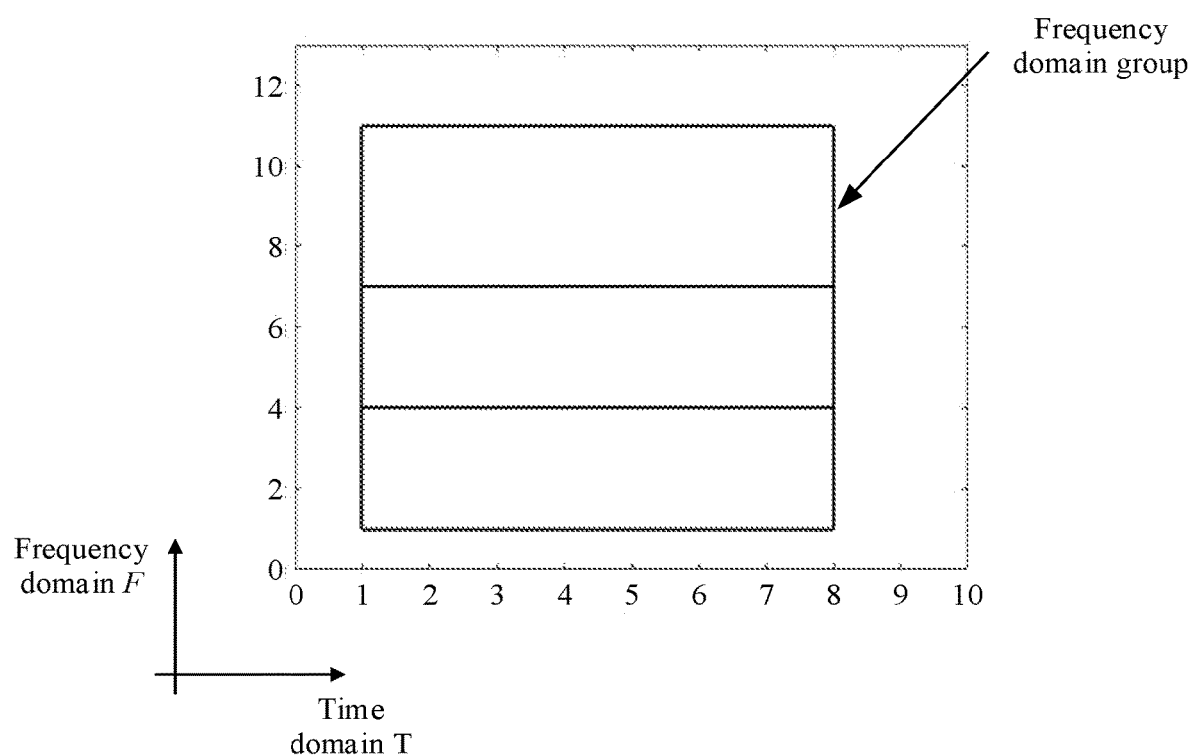
FIG. 6 is a diagram of a frequency domain group according to an embodiment of this application.

In addition, to enable the To symbols in time domain to be exactly grouped into the $G_{CI}$ groups, in this embodiment of this application, each of the former $G_{CI}-T_{CI}+\lfloor T_{CI}/G_{CI} \rfloor \cdot G_{CI}$ groups includes $\lfloor T_{CI}/G_{CI} \rfloor$ symbols, and each of remaining $T_{CI}-\lfloor T_{CI}/G_{CI} \rfloor \cdot G_{CI}$ groups includes $\lceil T_{CI}/G_{CI} \rceil$ symbols. An example in which $T_{GI}=7$, $G_{CI}=7$, $B_{CI}=10$, and X=21 is used. Referring to FIG. 5, seven symbols are grouped into seven time domain groups, and each time domain group has only one symbol. Similarly, to enable the $B_{CI}$ PRBs in frequency domain to be exactly grouped into the $N_{BI}$ groups, in this embodiment of this application, each of the former $N_{BI}-B_{CI}+\lfloor B_{CI}/N_{BI} \rfloor \cdot N_{BI}$ groups includes $\lfloor B_{CI}/N_{BI} \rfloor$ PRBs, and each of remaining $B_{CI}-\lfloor B_{CI}/N_{BI} \rfloor \cdot N_{BI}$ groups includes $\lceil B_{CI}/B_{BI} \rceil$ PRBs. "$\lceil \ \rceil$" represents rounding up, and "$\lfloor \ \rfloor$" represents rounding down. An example in which $T_{CI}=7$, $G_{CI}=7$, $B_{CI}=10$, and X=21 is used, and $N_{BI}=X/G_{CI}=3$. Referring to FIG. 6, 10 PRBs are grouped into three frequency domain groups, either of the former two frequency domain groups includes three PRBs, and the latter one frequency domain group includes four PRBs.

Figure 7:
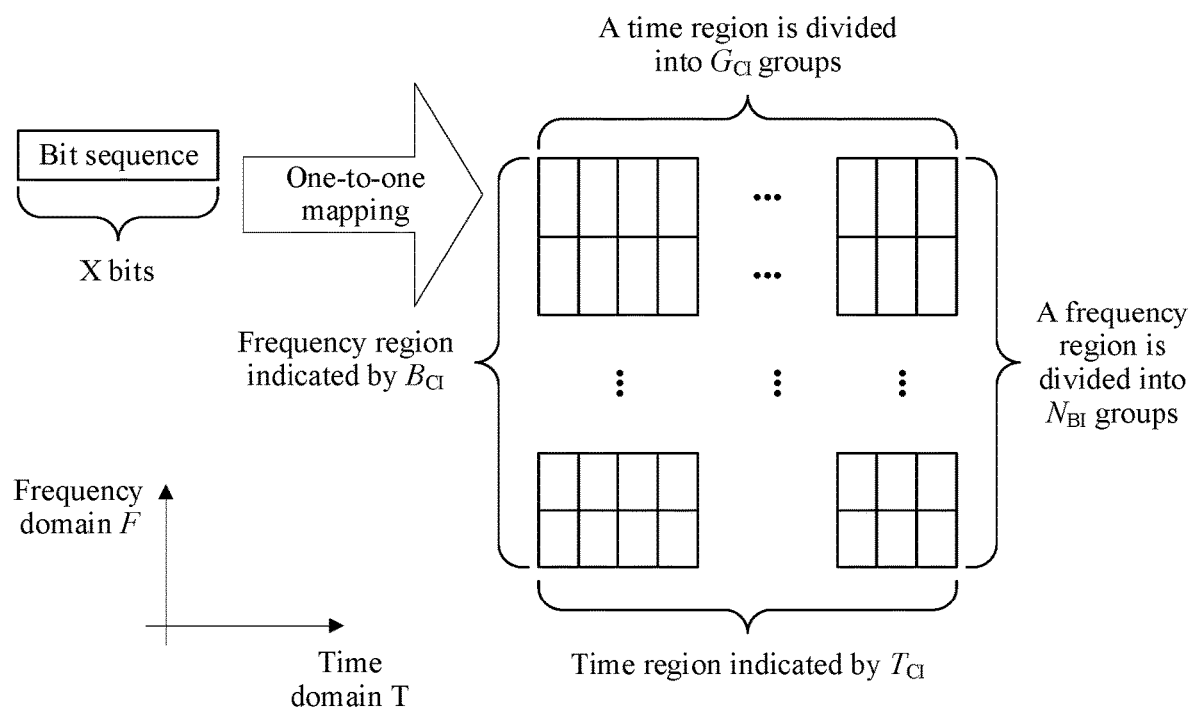
FIG. 7 is a diagram of grouping time-frequency resources according to an embodiment of this application.

In this case, one time-frequency resource region indicated for the monitoring occasion of each uplink cancellation indication of the terminal device based on $T_{CI}$, $B_{CI}$, $G_{CI}$, and $N_{BI}(X/G_{CI})$ can be grouped into a plurality of time-frequency resources, and one or more time-frequency resources corresponding to a same time domain range constitute one time-frequency resource group. That is, one or more time-frequency resources belonging to a same time domain group constitute one time-frequency resource group. For example, one time-frequency resource region indicated by the monitoring occasion of the uplink cancellation indication can be grouped into a form shown in FIG. 7. Each block in FIG. 7 may represent one time-frequency resource, and one or more time-frequency resources corresponding to a same time domain range constitute one time-frequency resource group. That is, time-frequency resources in each column constitute one time-frequency resource group.

In an embodiment, the network device may also separately send higher layer signaling for monitoring occasions of different uplink cancellation indications of the terminal device. Each piece of the higher layer signaling sent by the network device is used to only configure one time-frequency resource region corresponding to a monitoring occasion of an upcoming uplink cancellation indication of the terminal device, and is used for grouping of a time-frequency resource and a time-frequency resource group in the time-frequency resource region.

For the downlink interrupted transmission indication, the network device may also configure, for the terminal device by using higher layer signaling similar to that of the uplink cancellation indication, a time-frequency resource region indicated by the downlink interrupted transmission indication, and the higher layer signaling is used for grouping of a time-frequency resource and a time-frequency resource group in the time-frequency resource region. Details are not described herein again.

S202: The network device sends the transmission indication information to the terminal device, and the terminal device receives the transmission indication information.

The transmission indication information includes a bit sequence used to indicate transmission statuses of the N time-frequency resource groups, N bit groups in the bit sequence are in a one-to-one correspondence with the N time-frequency resource groups, and each of the N bit groups includes at least one bit.

An example in which the transmission indication information is the uplink cancellation indication is still used. The bit sequence included in the uplink cancellation indication information may be a sequence including X bits. Each bit in the bit sequence corresponds to one time-frequency resource, and is used to indicate whether to cancel uplink transmission of the terminal device on the time-frequency resource. Whether to cancel uplink transmission of the terminal device on the time-frequency resource may also be understood as whether to allow the terminal device to perform uplink transmission on the time-frequency resource, or whether the terminal device may perform uplink transmission on the time-frequency resource. In addition, similar to grouping X time-frequency resources into the N time-frequency resource groups (time domain groups), in this embodiment of this application, the X bits correspond to the N bit groups, and the N bit groups correspond one-to-one to the N time-frequency resource groups.

Figure 8:
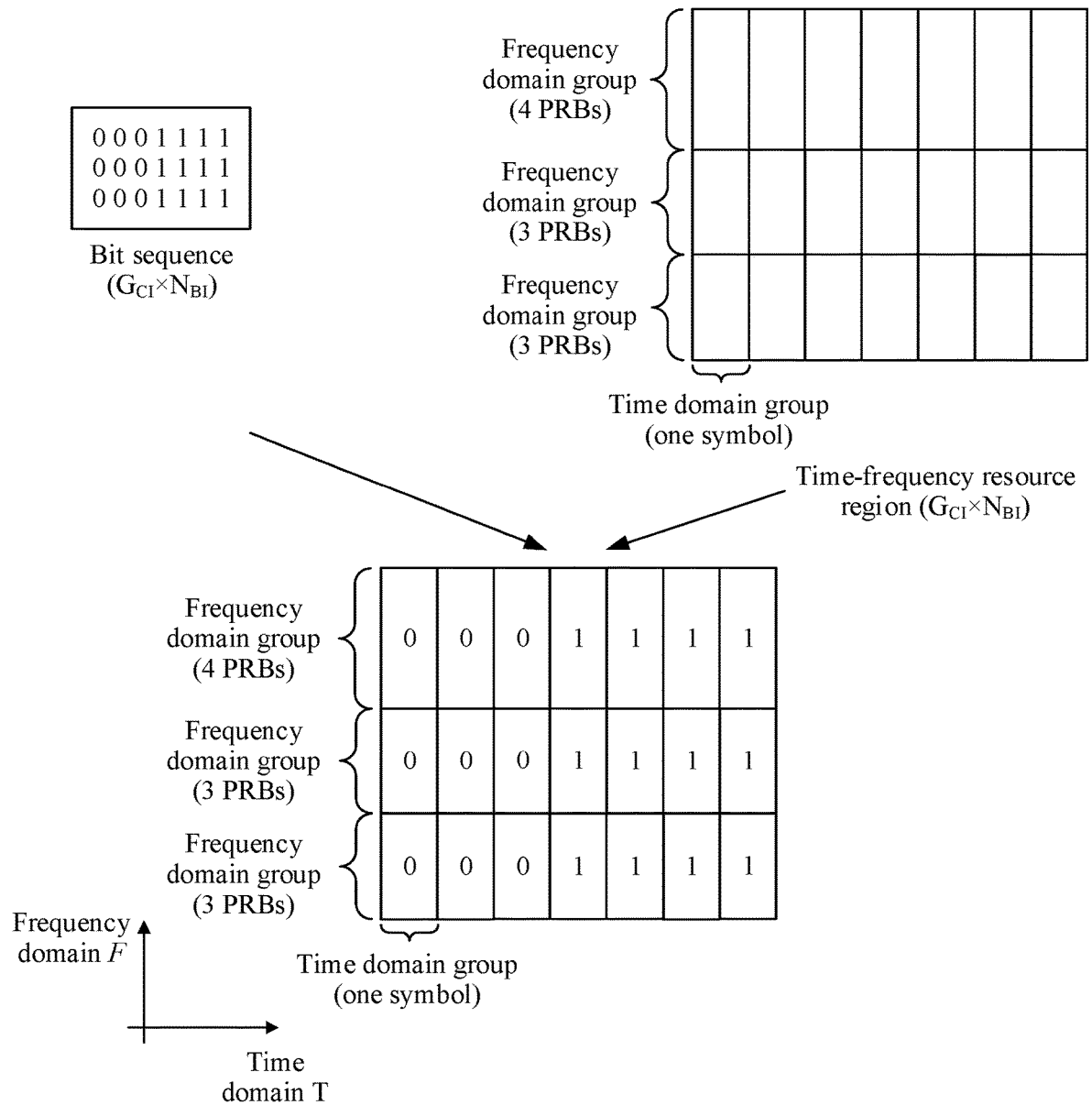
FIG. 8 is a diagram of a correspondence relationship between a bit sequence and a time-frequency resource according to an embodiment of this application.

For example, referring to FIG. 8, the bit sequence may exist in a form of a two-dimensional bitmap. The X bits in the bit sequence correspond one-to-one to the X time-frequency resources. If a value of a bit is set to 1, it may indicate that uplink transmission of the terminal device on a time-frequency resource corresponding to the bit is canceled. In other words, the terminal device may not perform uplink transmission on the time-frequency resource corresponding to the bit. If a value of a bit is set to 0, it may indicate that uplink transmission of the terminal device on a time-frequency resource corresponding to the bit is not canceled. In other words, the terminal device may perform uplink transmission on the time-frequency resource corresponding to the bit. Optionally, in this embodiment of this application, the bit sequence is grouped based on grouping of the indicated time-frequency resource region. For example, when the bit sequence exists in a form of a two-dimensional bitmap, each column is one bit group, and each bit group corresponds to one time domain group. In other words, each bit group corresponds to one time-frequency resource group.

In an embodiment, the uplink cancellation indication sent by the network device to the terminal device may be an uplink cancellation indication for one terminal device group, and the terminal device group may include one or more terminal devices. Each terminal device in the terminal device group may correspond to one indication region in the uplink cancellation indication, and is used to carry the uplink cancellation indication information sent to the terminal device. Alternatively, it may also be understood that the uplink cancellation indication includes one or more information blocks, each terminal device in the terminal device group corresponds to one information block in the uplink cancellation indication, and each information block includes uplink cancellation indication information corresponding to the terminal device.

Figure 9:
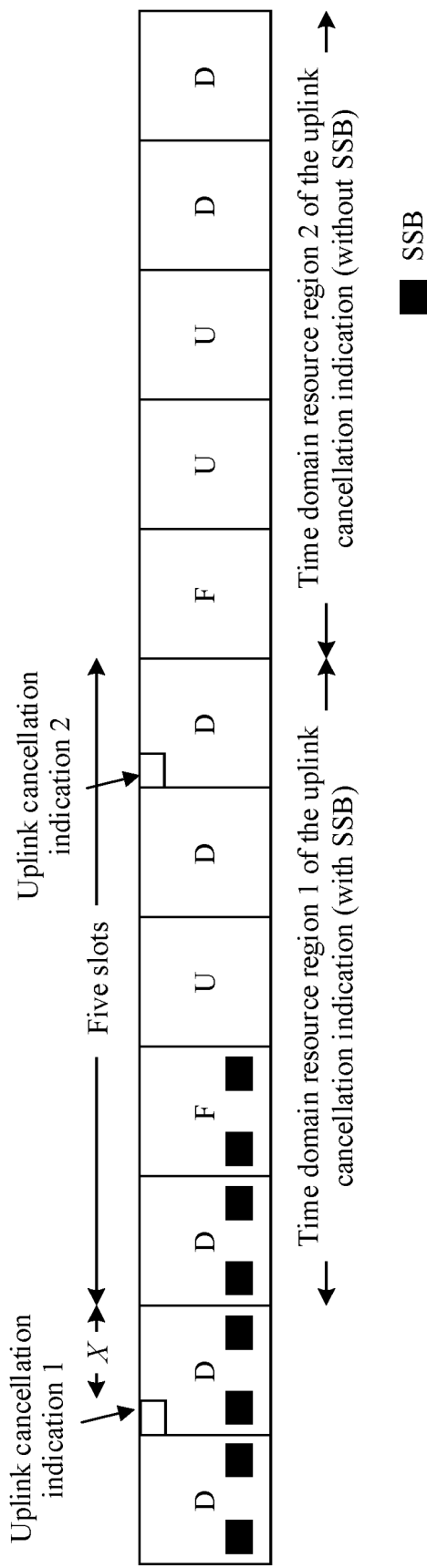
FIG. 9 is a diagram of slots in a TDD system according to an embodiment of this application.
Figure 10:
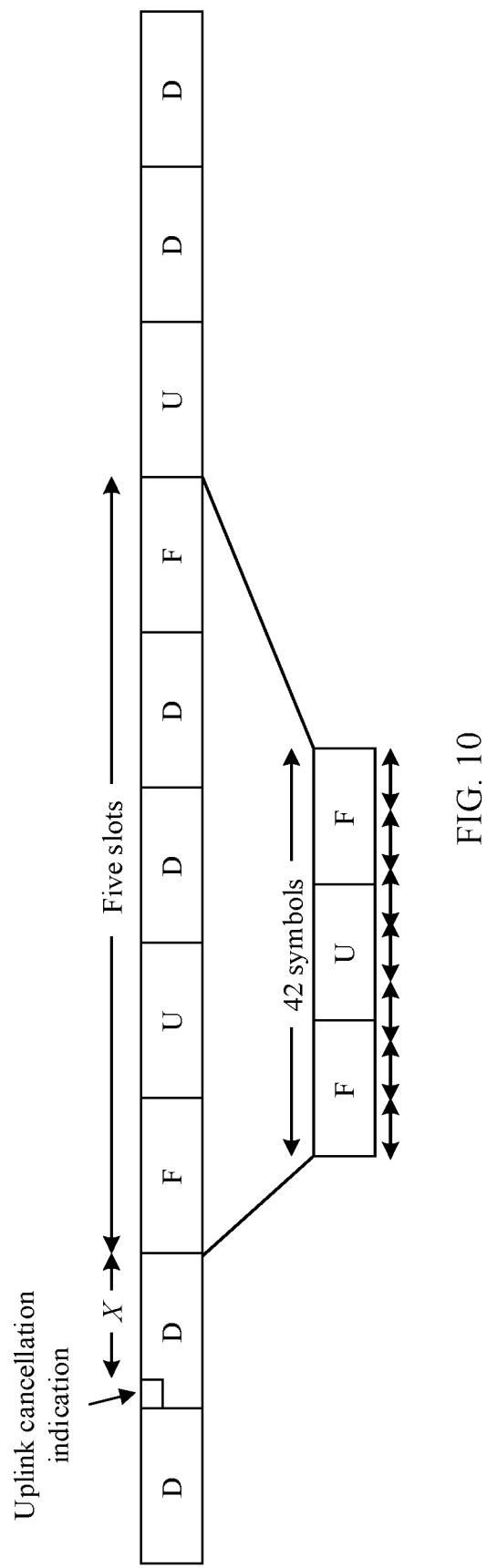
FIG. 10 is a diagram of determining a time domain resource region of an uplink cancellation indication according to an embodiment of this application.

In a TDD system, uplink and downlink symbols appear at different times. Therefore, as shown in FIG. 9, F represents a flexible slot, U represents an uplink slot, and D represents a downlink slot. Although a configured value of $T_{CI}$ corresponding to time domain in the higher layer signaling is 5, and each slot has 14 symbols for a normal cyclic prefix (normal CP) in NR, there are a total of 5×14=70 symbols. However, for an uplink cancellation indication, symbols corresponding to a downlink slot and a synchronization signal block (SSB) region need to be excluded, and only when remaining symbols are concatenated together, a real time domain resource region of the uplink cancellation indication (UL CI time domain resource region) is formed. For example, as shown in FIG. 10, there are originally 70 symbols (five slots) in the time domain resource region of the uplink cancellation indication. However, after semi-static downlink slots are excluded, there are only three slots, that is, 42 symbols. Assuming that $G_{CI}=7$, and the 42 symbols are evenly grouped into seven time domain groups, among six symbols included in the fifth time domain group, the former four symbols are actually separated from the latter two symbols by two downlink slots. Therefore, the time domain group (that is, the time-frequency resource group) obtained through grouping according to the higher layer signaling may be separated by M downlink symbols in time domain. That is, a plurality of time-frequency resources in a time domain group are separated by M downlink symbols in time domain, and M is a positive integer. However, the network device usually does not perform cross-symbol scheduling on the time-frequency resource of the terminal device. To avoid unnecessary uplink transmission cancellation, in this embodiment of this application, when the time domain group (that is, the time-frequency resource group) is separated by M downlink symbols in time domain, an indication of the bit group in the bit sequence to the time-frequency resource group may be adjusted. An example in which the time-frequency resource group separated by the M downlink symbols in time domain is an $i^{th}$ time-frequency resource group is used.

Manner 1: Combine a former half (a time-frequency resource before the M downlink symbols) of the $i^{th}$ time-frequency resource group with an adjacent time-frequency resource group, to indicate (or determine) a transmission status. An $(i-1)^{th}$ bit group in the bit sequence indicates a transmission status of an $(i-1)^{th}$ time-frequency resource group and a transmission status of the time-frequency resource before the M downlink symbols in the $i^{th}$ time-frequency resource group, and an $i^{th}$ bit group in the bit sequence indicates a transmission status of a time-frequency resource after the M downlink symbols in the $i^{th}$ time-frequency resource group.

Figure 11:
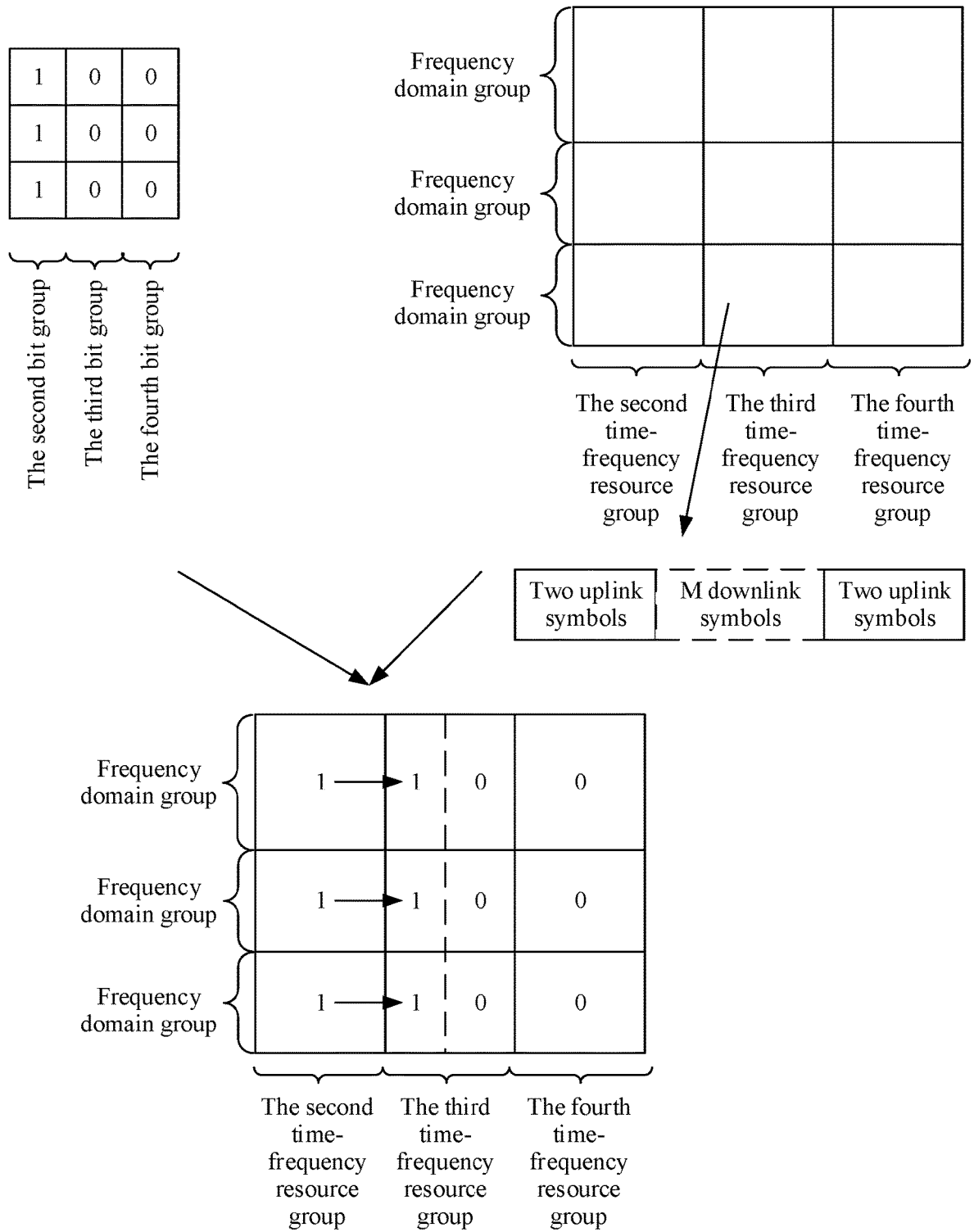
FIG. 11 is a diagram 1 of a bit group indicating a time-frequency resource group according to an embodiment of this application.

For example, as shown in FIG. 11, the third time-frequency resource group is separated by the M downlink symbols in time domain, there are two uplink symbols before the M downlink symbols, and there are two uplink symbols after the M downlink symbols. Therefore, the second bit group in the bit sequence indicates a transmission status of the second time-frequency resource group and a transmission status of the two uplink symbols before the M downlink symbols in the third time-frequency resource group, and the third bit group in the bit sequence indicates a transmission status of the two uplink symbols after the M downlink symbols in the third time-frequency resource group.

Manner 2: Combine a latter half (a time-frequency resource after the M downlink symbols) of the $i^{th}$ time-frequency resource group with an adjacent time-frequency resource group, to indicate (or determine) a transmission status. An $i^{th}$ bit group in the bit sequence indicates a transmission status of a time-frequency resource before the M downlink symbols in the $i^{th}$ time-frequency resource group, and an $(i+1)^{th}$ bit group in the bit sequence indicates a transmission status of the time-frequency resource after the M downlink symbols in the $i^{th}$ time-frequency resource group and a transmission status of an $(i+1)^{th}$ time-frequency resource group.

Figure 12:
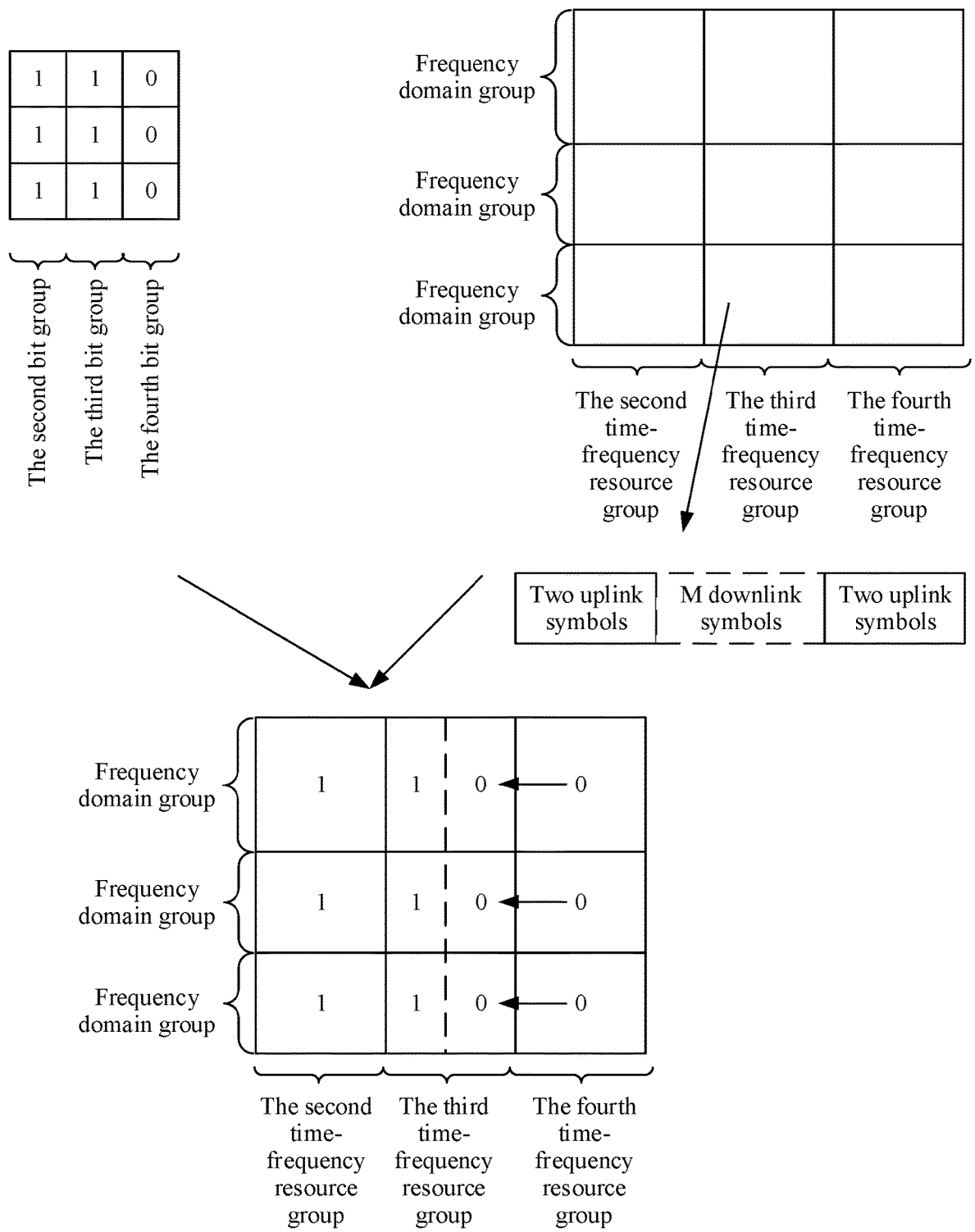
FIG. 12 is a diagram 2 of a bit group indicating a time-frequency resource group according to an embodiment of this application.

For example, as shown in FIG. 12, the third time-frequency resource group is separated by the M downlink symbols in time domain, there are two uplink symbols before the M downlink symbols, and there are two uplink symbols after the M downlink symbols. Therefore, the third bit group in the bit sequence indicates a transmission status of the two uplink symbols before the M downlink symbols in the third time-frequency resource group, and the fourth bit group in the bit sequence indicates a transmission status of the two uplink symbols after the M downlink symbols in the third time-frequency resource group and a transmission status of the fourth time-frequency resource group.

Manner 3: Select, based on quantities of symbols respectively included in a former half and a latter half of the $i^{th}$ time-frequency resource group, a half that includes a relatively small quantity of symbols, and combine the half into a time-frequency resource group adjacent to the half, to indicate (or determine) a transmission status. When a quantity of symbols of the $i^{th}$ time-frequency resource group that are before the M downlink symbols is less than a quantity of symbols of the $i^{th}$ time-frequency resource group that are after the M downlink symbols, an $(i-1)^{th}$ bit group in the bit sequence may indicate a transmission status of an $(i-1)^{th}$ time-frequency resource group and a transmission status of a time-frequency resource before the M downlink symbols in the $i^{th}$ time-frequency resource group, and an $i^{th}$ bit group in the bit sequence indicates a transmission status of a time-frequency resource after the M downlink symbols in the $i^{th}$ time-frequency resource group; or when a quantity of symbols of the $i^{th}$ time-frequency resource group that are before the M downlink symbols is greater than or equal to a quantity of symbols of the $i^{th}$ time-frequency resource group that are after the M downlink symbols, an $i^{th}$ bit group in the bit sequence indicates a transmission status of a time-frequency resource before the M downlink symbols in the $i^{th}$ time-frequency resource group, and an $(i+1)^{th}$ bit group in the bit sequence indicates a transmission status of a time-frequency resource after the M downlink symbols in the $i^{th}$ time-frequency resource group and a transmission status of an $(i+1)$ time-frequency resource group.

Certainly, alternatively, when the quantity of symbols of the $i^{th}$ time-frequency resource group that are before the M downlink symbols is less than or equal to the quantity of symbols of the $i^{th}$ time-frequency resource group that are after the M downlink symbols, the $(i-1)^{th}$ bit group in the bit sequence may indicate the transmission status of the $(i-1)^{th}$ time-frequency resource group and the transmission status of the time-frequency resource before the M downlink symbols in the $i^{th}$ time-frequency resource group, and the $i^{th}$ bit group in the bit sequence indicates the transmission status of the time-frequency resource after the M downlink symbols in the $i^{th}$ time-frequency resource group; or when the quantity of symbols of the $i^{th}$ time-frequency resource group that are before the M downlink symbols is greater than the quantity of symbols of the $i^{th}$ time-frequency resource group that are after the M downlink symbols, the $i^{th}$ bit group in the bit sequence indicates the transmission status of the time-frequency resource before the M downlink symbols in the $i^{th}$ time-frequency resource group, and the $(i+1)^{th}$ bit group in the bit sequence indicates the transmission status of the time-frequency resource after the M downlink symbols in the $i^{th}$ time-frequency resource group and the transmission status of the $(i+1)^{th}$ time-frequency resource group.

Manner 4: Select, based on quantities of symbols respectively included in a former half and a latter half of the $i^{th}$ time-frequency resource group, a half in which a quantity of included symbols conforms to a combination quantity (for example, one or two), and combine the half into a time-frequency resource group adjacent to the half, to indicate (or determine) a transmission status. When a quantity of symbols of the $i^{th}$ time-frequency resource group that are before the M first symbols is one or two, an $(i-1)^{th}$ bit group in the bit sequence indicates a transmission status of an $(i-1)^{th}$ time-frequency resource group and a transmission status of a time-frequency resource before the M first symbols in the $i^{th}$ time-frequency resource group, and an $i^{th}$ bit group in the bit sequence indicates a transmission status of a time-frequency resource after the M first symbols in the $i^{th}$ time-frequency resource group, where i is a positive integer greater than or equal to 2 and less than or equal to N. Alternatively, when a quantity of symbols of the $i^{th}$ time-frequency resource group that are after the M first symbols is one or two, an $i^{th}$ bit group in the bit sequence indicates a transmission status of a time-frequency resource before the M first symbols in the $i^{th}$ time-frequency resource group, and an $(i+1)^{th}$ bit group in the bit sequence indicates a transmission status of a time-frequency resource after the M first symbols in the $i^{th}$ time-frequency resource group and a transmission status of an $(i+1)^{th}$ time-frequency resource group, where i is a positive integer less than or equal to N−1.

In addition, specially, when the $i^{th}$ time-frequency resource group is the first time-frequency resource group in time domain or the last time-frequency resource group in time domain, in this embodiment of this application, when a time domain location of the $i^{th}$ time-frequency resource group is a time-frequency resource group with a headmost time domain location among the N time-frequency resource groups (in other words, the $i^{th}$ time-frequency resource group is the first time-frequency resource group in time domain), the $i^{th}$ bit group in the bit sequence indicates the transmission status of the time-frequency resource before the M downlink symbols in the $i^{th}$ time-frequency resource group, and the $(i+1)^{th}$ bit group in the bit sequence indicates the transmission status of the time-frequency resource after the M downlink symbols in the $i^{th}$ time-frequency resource group and the transmission status of the time-frequency resource group.

When the time domain location of the $i^{th}$ time-frequency resource group is a time-frequency resource group with a rearmost time domain location among the N time-frequency resource groups (in other words, the $i^{th}$ time-frequency resource group is the last time-frequency resource group in time domain), the $(i-1)^{th}$ bit group in the bit sequence indicates the transmission status of the $(i-1)^{th}$ time-frequency resource group and the transmission status of the time-frequency resource before the M downlink symbols in the $i^{th}$ time-frequency resource group, and the $i^{th}$ bit group in the bit sequence indicates the transmission status of the time-frequency resource after the M downlink symbols in the $i^{th}$ time-frequency resource group.

In addition, when only one time-frequency resource group may occur, that is, when N=1, in this embodiment of this application, when there is only one time-frequency resource group, even if the time-frequency resource group is separated by the M downlink symbols in time domain, the time-frequency resource group is still directly indicated by using a bit group corresponding to the time-frequency resource group.

In addition, when a time domain group (that is, a time-frequency resource group) occurs in time domain and is separated by M downlink symbols, if a quantity of downlink symbols for separation is relatively small, a transmission status of a time-frequency resource in the time-frequency resource group before the M downlink symbols and a transmission status of a time-frequency resource after the M downlink symbols are generally the same. Therefore, in an embodiment, when the time domain group (that is, the time-frequency resource group) occurs in time domain and is separated by the M downlink symbols, before an indication of a bit group in the bit sequence to the time-frequency resource group is adjusted, whether M is greater than or equal to a first threshold may be further determined. The indication of the bit group in the bit sequence to the time-frequency resource group is adjusted only when M is greater than or equal to the first threshold, where the first threshold may be one or more symbols, or may be a quantity of symbols corresponding to one or more slots. The first threshold is predefined by a protocol. Alternatively, the first threshold is configured for the terminal device by using signaling after being determined by the network device.

In addition, types of the M downlink symbols may be further specified, and may be semi-persistent downlink symbols configured by the network device for the terminal device by using higher layer signaling, or may be downlink symbols corresponding to SS/PBCH blocks configured by the network device for the terminal device. The SS is a synchronization signal, the PBCH is a physical broadcast channel, and the SS/PBCH blocks are a group of time-frequency resources used to send the SS and the PBCH.

The indication of the bit group in the bit sequence to the time-frequency resource group is adjusted, so that the uplink cancellation indication sent by the network device can be effectively prevented from performing cross-symbol indication on the transmission status of the time-frequency resource in the time-frequency resource group.

For the downlink interrupted transmission indication, the time-frequency resource region indicated by the downlink interrupted transmission indication configured by the network device for the terminal device generally includes only a downlink symbol, and there is a problem that a time-frequency resource group crosses M uplink symbols. For adjustment of the indication, included in the downlink interrupted transmission indication, of the bit group in the bit sequence to the time-frequency resource group, refer to the adjustment of the indication, included in the uplink cancellation indication, of the bit group in the bit sequence to the time-frequency resource group. Repeated descriptions are not described again.

In addition, it should be noted that the terminal device or the network device may determine the N time-frequency resource groups based on the higher layer signaling before the transmission indication information is received or after the transmission indication information is received, for example, after transmission indication information A is received, determine, based on the higher layer signaling, N time-frequency resource groups indicated by the transmission indication information A.

S203: The network device sends data scheduling information to the terminal device, and the terminal device receives the data scheduling information.

The data scheduling information indicates a first time-frequency resource for data transmission.

It may be understood that the network device may send the data scheduling information to the terminal device before the network device sends the transmission indication information to the terminal device, or after the network device sends the transmission indication information to the terminal device, or the network device may send the data scheduling information and the transmission indication information to the terminal device at the same time. This is not limited in this embodiment of this application.

S204: The terminal device performs data transmission with the network device based on the transmission status of each of the N time-frequency resource groups and the first time-frequency resource.

Figure 13:
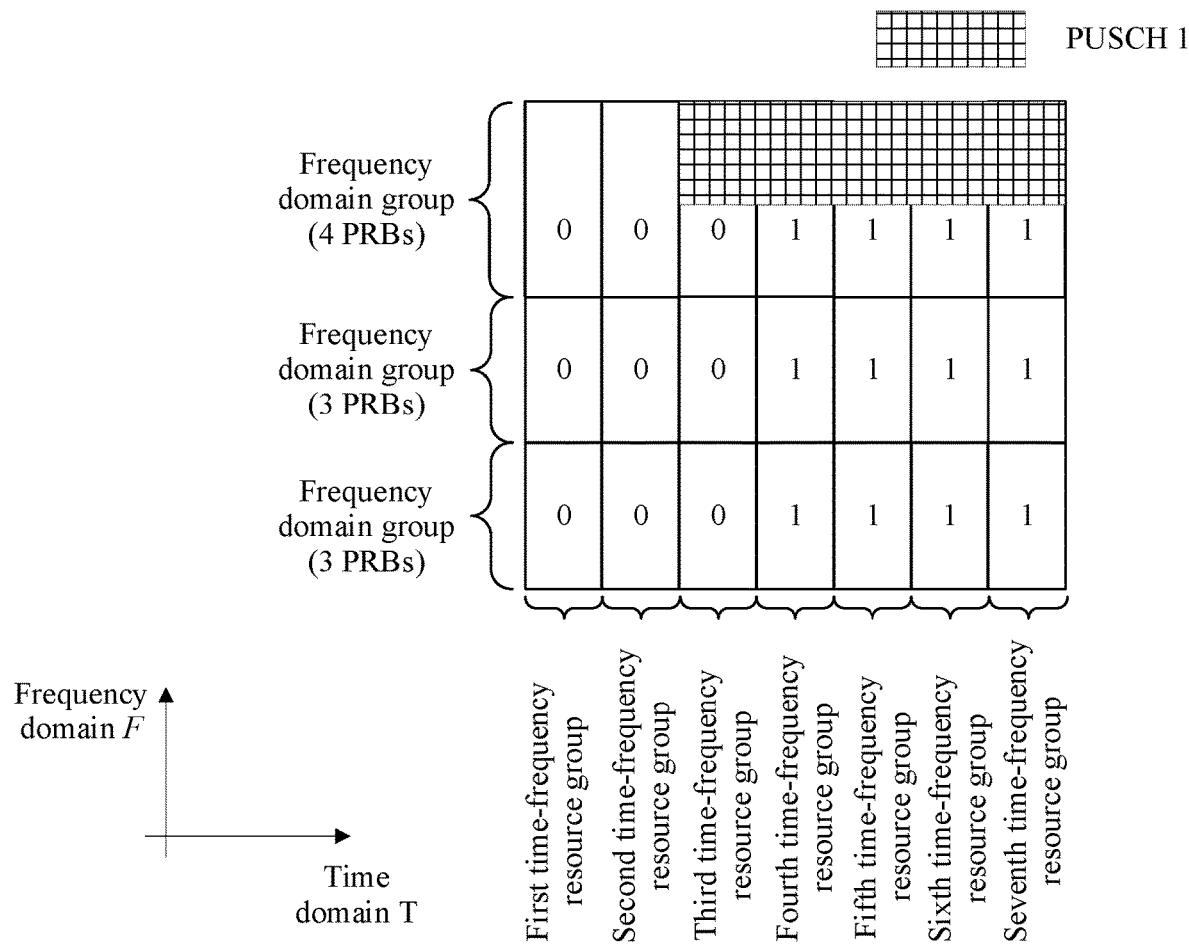
FIG. 13 is a diagram of a transmission status of a time-frequency resource indicated by data scheduling information according to an embodiment of this application.

An example in which the transmission indication information is an uplink cancellation indication is still used. Referring to FIG. 13, the network device indicates that the first time-frequency resource is a time-frequency resource corresponding to a PUSCH 1, and in a time-frequency resource group corresponding to the PUSCH 1, only a transmission status of the third time-frequency resource group is that uplink transmission of the terminal device is not canceled, and the terminal device sends uplink data only on a PRB occupied by the PUSCH 1 in the third time-frequency resource group. The network device receives, on the PRB occupied by the PUSCH 1 in the third time-frequency resource group, the uplink data sent by the terminal device.

Correspondingly, for the downlink interrupted transmission indication, the terminal device may receive downlink data only on a time-frequency resource whose transmission status is that the terminal device has downlink transmission.

The foregoing mainly describes the solutions provided in this application from a perspective of interaction between the network device and the terminal device. It may be understood that, to implement the foregoing functions, each network element includes a hardware structure and/or a software module (or unit) corresponding to each function. A person skilled in the art should be easily aware that units, algorithms, and steps in the examples described with reference to the embodiments disclosed in this specification can be implemented in a form of hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

Figure 14:
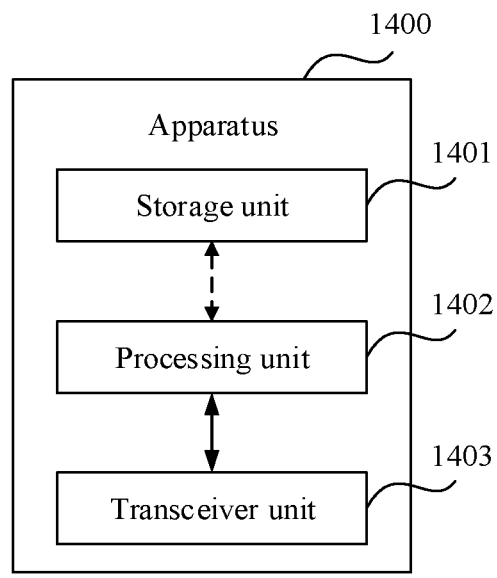
FIG. 14 is a diagram 1 of a communication apparatus according to an embodiment of this application.
Figure 15:
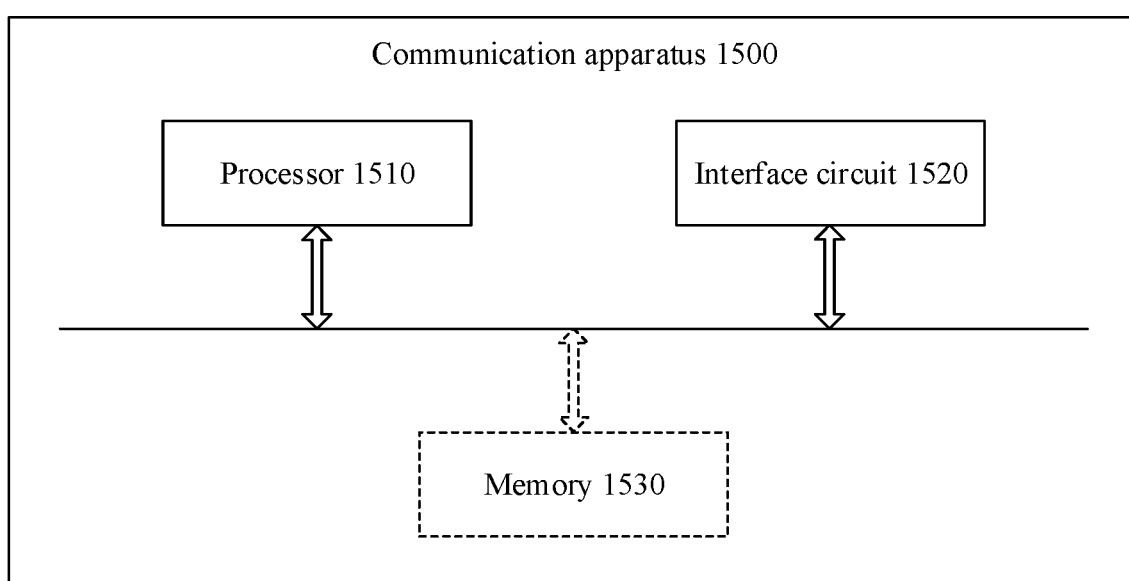
FIG. 15 is a diagram 2 of a communication apparatus according to an embodiment of this application.

FIG. 14 and FIG. 15 are diagrams of structures of communication apparatuses according to embodiments of this application. These communication apparatuses may be configured to implement a function of the terminal device or the network device in the foregoing method embodiment, and therefore, can also implement a beneficial effect of the method embodiment. In the embodiments of this application, the communication apparatus may be any terminal device in FIG. 1, may be the network device in FIG. 1, or may be a module (chip) applied to the terminal device or the network device.

As shown in FIG. 14, a communication apparatus 1400 may include: a processing unit 1402 and a transceiver unit 1403, and may further include a storage unit 1401. The communication apparatus 1400 is configured to implement a function of the terminal device or the network device in the foregoing method embodiment shown in FIG. 2.

In an embodiment, the processing unit 1402 is configured to implement a corresponding processing function. The transceiver unit 1403 is configured to support communication between the communication apparatus 1400 and another network entity. The storage unit 1401 is configured to store program code and/or data of the communication apparatus 1400. Optionally, the transceiver unit 1403 may include a receiving unit and/or a sending unit that are respectively configured to perform a receiving operation and a sending operation.

When the communication apparatus 1400 is configured to implement the function of the terminal device in the foregoing method embodiment shown in FIG. 2: the processing unit 1402 is configured to determine N time-frequency resource groups, where each of the N time-frequency resource groups includes at least one time-frequency resource, and N is a positive integer greater than or equal to 2; and the transceiver unit 1403 is configured to: receive transmission indication information from the network device, where the transmission indication information includes a bit sequence used to indicate transmission statuses of the N time-frequency resource groups, N bit groups in the bit sequence are in a one-to-one correspondence with the N time-frequency resource groups, and each of the N bit groups includes at least one bit; and perform data transmission with the network device based on the transmission status of each of the N time-frequency resource groups.

When an $i^{th}$ time-frequency resource group among the N time-frequency resource groups is separated by M first symbols in time domain, where M is a positive integer, an $(i-1)^{th}$ bit group in the bit sequence indicates a transmission status of an $(i-1)^{th}$ time-frequency resource group and a transmission status of a time-frequency resource before the M first symbols in the $i^{th}$ time-frequency resource group, and an $i^{th}$ bit group in the bit sequence indicates a transmission status of a time-frequency resource after the M first symbols in the $i^{th}$ time-frequency resource group, where i is a positive integer greater than or equal to 2 and less than or equal to N. Alternatively, an $i^{th}$ bit group in the bit sequence indicates a transmission status of a time-frequency resource before the M first symbols in the $i^{th}$ time-frequency resource group, and an $(i+1)^{th}$ bit group in the bit sequence indicates a transmission status of a time-frequency resource after the M first symbols in the $i^{th}$ time-frequency resource group and a transmission status of an $(i+1)^{th}$ time-frequency resource group, where i is a positive integer less than or equal to N−1.

Optionally, the transmission indication information may be used to cancel uplink transmission or downlink transmission. When the transmission indication information is used to cancel uplink transmission, the transmission indication information may be an uplink cancellation indication used to indicate whether the terminal device cancels uplink transmission on a corresponding time-frequency resource. In this case, a determined time-frequency resource group usually includes only an uplink symbol, and a first symbol separating the time-frequency resource group in time domain is generally a downlink symbol. When the transmission indication information is used to cancel downlink transmission, the transmission indication information may be a downlink interrupted transmission indication used to indicate whether the terminal device has downlink transmission on a corresponding time-frequency resource. In this case, a determined time-frequency resource group usually includes only a downlink symbol, and a first symbol separating the time-frequency resource group in time domain is generally an uplink symbol.

In an embodiment, when a quantity of symbols of the $i^{th}$ time-frequency resource group that are before the M first symbols is less than a quantity of symbols of the $i^{th}$ time-frequency resource group that are after the M first symbols, the $(i-1)^{th}$ bit group in the bit sequence indicates the transmission status of the $(i-1)^{th}$ time-frequency resource group and the transmission status of the time-frequency resource before the M first symbols in the $i^{th}$ time-frequency resource group, and the $i^{th}$ bit group in the bit sequence indicates the transmission status of the time-frequency resource after the M first symbols in the $i^{th}$ time-frequency resource group, where i is a positive integer greater than or equal to 2 and less than or equal to N.

In an embodiment, when a quantity of symbols of the $i^{th}$ time-frequency resource group that are before the M first symbols is greater than or equal to a quantity of symbols of the $i^{th}$ time-frequency resource group that are after the M first symbols, the $i^{th}$ bit group in the bit sequence indicates the transmission status of the time-frequency resource before the M first symbols in the $i^{th}$ time-frequency resource group, and the $(i+1)^{th}$ bit group in the bit sequence indicates the transmission status of the time-frequency resource after the M first symbols in the $i^{th}$ time-frequency resource group and the transmission status of the $(i+1)^{th}$ time-frequency resource group, where i is a positive integer less than or equal to N−1.

In an embodiment, when a quantity of symbols of the $i^{th}$ time-frequency resource group that are before the M first symbols is one or two, the $(i-1)^{th}$ bit group in the bit sequence indicates the transmission status of the $(i-1)^{th}$ time-frequency resource group and the transmission status of the time-frequency resource before the M first symbols in the $i^{th}$ time-frequency resource group, and the $i^{th}$ bit group in the bit sequence indicates the transmission status of the time-frequency resource after the M first symbols in the $i^{th}$ time-frequency resource group, where i is a positive integer greater than or equal to 2 and less than or equal to N. Alternatively, when a quantity of symbols of the $i^{th}$ time-frequency resource group that are after the M first symbols is one or two, the $i^{th}$ bit group in the bit sequence indicates the transmission status of the time-frequency resource before the M first symbols in the $i^{th}$ time-frequency resource group, and the $(i+1)^{th}$ bit group in the bit sequence indicates the transmission status of the time-frequency resource after the M first symbols in the $i^{th}$ time-frequency resource group and the transmission status of the $(i+1)^{th}$ time-frequency resource group, where i is a positive integer less than or equal to N−1.

In an embodiment, when a time domain location of the $i^{th}$ time-frequency resource group is a time-frequency resource group with a headmost time domain location among the N time-frequency resource groups, the $i^{th}$ bit group in the bit sequence indicates the transmission status of the time-frequency resource before the M first symbols in the $i^{th}$ time-frequency resource group, and the $(i+1)^{th}$ bit group in the bit sequence indicates the transmission status of the time-frequency resource after the M first symbols in the $i^{th}$ time-frequency resource group and the transmission status of the $(i+1)^{th}$ time-frequency resource group.

In an embodiment, when the time domain location of the $i^{th}$ time-frequency resource group is a time-frequency resource group with a rearmost time domain location among the N time-frequency resource groups, the $(i-1)^{th}$ bit group in the bit sequence indicates the transmission status of the $(i-1)^{th}$ time-frequency resource group and the transmission status of the time-frequency resource before the M first symbols in the $i^{th}$ time-frequency resource group, and the $i^{th}$ bit group in the bit sequence indicates the transmission status of the time-frequency resource after the M first symbols in the $i^{th}$ time-frequency resource group.

In an embodiment, only when M is greater than or equal to a first threshold, a former half or a latter half of a time-frequency resource group separated by a first symbol in time domain can be combined into an adjacent time-frequency resource group, to determine a transmission status.

In an embodiment, the transceiver unit 1403 is further configured to receive data scheduling information from the network device, where the data scheduling information indicates a first time-frequency resource for data transmission; and when performing data transmission with the network device based on the transmission status of each of the N time-frequency resource groups, the processing unit 1402 is configured to perform data transmission with the network device based on the transmission status of each of the N time-frequency resource groups and the first time-frequency resource.

When the communication apparatus 1400 is configured to implement the function of the network device in the method embodiment shown in FIG. 2, the processing unit 1402 is configured to determine N time-frequency resource groups, where each of the N time-frequency resource groups includes at least one time-frequency resource, and N is a positive integer greater than or equal to 2; the transceiver unit 1403 is configured to: send transmission indication information to the terminal device, where the transmission indication information includes a bit sequence used to indicate transmission statuses of the N time-frequency resource groups, N bit groups in the bit sequence are in a one-to-one correspondence with the N time-frequency resource groups, and each of the N bit groups includes at least one bit; and perform data transmission with the terminal device based on the transmission status of each of the N time-frequency resource groups.

When an $i^{th}$ time-frequency resource group among the N time-frequency resource groups is separated by M first symbols in time domain, where M is a positive integer, an $(i-1)^{th}$ bit group in the bit sequence indicates a transmission status of an $(i-1)^{th}$ time-frequency resource group and a transmission status of a time-frequency resource before the M first symbols in the $i^{th}$ time-frequency resource group, and an $i^{th}$ bit group in the bit sequence indicates a transmission status of a time-frequency resource after the M first symbols in the $i^{th}$ time-frequency resource group, where i is a positive integer greater than or equal to 2 and less than or equal to N. Alternatively, an $i^{th}$ bit group in the bit sequence indicates a transmission status of a time-frequency resource before the M first symbols in the $i^{th}$ time-frequency resource group, and an $(i+1)^{th}$ bit group in the bit sequence indicates a transmission status of a time-frequency resource after the M first symbols in the $i^{th}$ time-frequency resource group and a transmission status of an $(i+1)^{th}$ time-frequency resource group, where i is a positive integer less than or equal to N−1.

Optionally, the transmission indication information may be used to cancel uplink transmission or downlink transmission. When the transmission indication information is used to cancel uplink transmission, the transmission indication information may be an uplink cancellation indication used to indicate whether the terminal device cancels uplink transmission on a corresponding time-frequency resource. In this case, a determined time-frequency resource group usually includes only an uplink symbol, and a first symbol separating the time-frequency resource group in time domain is generally a downlink symbol. When the transmission indication information is used to cancel downlink transmission, the transmission indication information may be a downlink interrupted transmission indication used to indicate whether the terminal device has downlink transmission on a corresponding time-frequency resource. In this case, a determined time-frequency resource group usually includes only a downlink symbol, and a first symbol separating the time-frequency resource group in time domain is generally an uplink symbol.

In an embodiment, when a quantity of symbols of the $i^{th}$ time-frequency resource group that are before the M first symbols is less than a quantity of symbols of the $i^{th}$ time-frequency resource group that are after the M first symbols, the $(i-1)^{th}$ bit group in the bit sequence indicates the transmission status of the $(i-1)^{th}$ time-frequency resource group and the transmission status of the time-frequency resource before the M first symbols in the $i^{th}$ time-frequency resource group, and the $i^{th}$ bit group in the bit sequence indicates the transmission status of the time-frequency resource after the M first symbols in the $i^{th}$ time-frequency resource group, where i is a positive integer greater than or equal to 2 and less than or equal to N.

In an embodiment, when a quantity of symbols of the $i^{th}$ time-frequency resource group that are before the M first symbols is greater than or equal to a quantity of symbols of the $i^{th}$ time-frequency resource group that are after the M first symbols, the $i^{th}$ bit group in the bit sequence indicates the transmission status of the time-frequency resource before the M first symbols in the $i^{th}$ time-frequency resource group, and the $(i+1)^t$ bit group in the bit sequence indicates the transmission status of the time-frequency resource after the M first symbols in the $i^{th}$ time-frequency resource group and the transmission status of the $(i+1)^{th}$ time-frequency resource group, where i is a positive integer less than or equal to N−1.

In an embodiment, when a quantity of symbols of the $i^{th}$ time-frequency resource group that are before the M first symbols is one or two, the $(i-1)^{th}$ bit group in the bit sequence indicates the transmission status of the $(i-1)^{th}$ time-frequency resource group and the transmission status of the time-frequency resource before the M first symbols in the $i^{th}$ time-frequency resource group, and the $i^{th}$ bit group in the bit sequence indicates the transmission status of the time-frequency resource after the M first symbols in the $i^{th}$ time-frequency resource group, where i is a positive integer greater than or equal to 2 and less than or equal to N. Alternatively, when a quantity of symbols of the $i^{th}$ time-frequency resource group that are after the M first symbols is one or two, the $i^{th}$ bit group in the bit sequence indicates the transmission status of the time-frequency resource before the M first symbols in the $i^{th}$ time-frequency resource group, and the $(i+1)^{th}$ bit group in the bit sequence indicates the transmission status of the time-frequency resource after the M first symbols in the $i^{th}$ time-frequency resource group and the transmission status of the $(i+1)^{th}$ time-frequency resource group, where i is a positive integer less than or equal to N−1.

In an embodiment, when a time domain location of the $i^{th}$ time-frequency resource group is a time-frequency resource group with a headmost time domain location among the N time-frequency resource groups, the $i^{th}$ bit group in the bit sequence indicates the transmission status of the time-frequency resource before the M first symbols in the $i^{th}$ time-frequency resource group, and the $(i+1)^{th}$ group in the bit sequence indicates the transmission status of the time-frequency resource after the M first symbols in the $i^{th}$ time-frequency resource group and the transmission status of the $(i+1)^{th}$ time-frequency resource group.

In an embodiment, when the time domain location of the $i^{th}$ time-frequency resource group is a time-frequency resource group with a rearmost time domain location among the N time-frequency resource groups, the $(i-1)^{th}$ bit group in the bit sequence indicates the transmission status of the $(i-1)^{th}$ time-frequency resource group and the transmission status of the time-frequency resource before the M first symbols in the $i^{th}$ time-frequency resource group, and the $i^{th}$ bit group in the bit sequence indicates the transmission status of the time-frequency resource after the M first symbols in the $i^{th}$ time-frequency resource group.

In an embodiment, only when M is greater than or equal to a first threshold, a former half or a latter half of a time-frequency resource group separated by a first symbol in time domain can be combined into an adjacent time-frequency resource group, to indicate a transmission status.

In an embodiment, the transceiver unit 1403 is further configured to send data scheduling information to the terminal device, where the data scheduling information indicates a first time-frequency resource for data transmission; and when performing data transmission with the terminal device based on the transmission status of each of the N time-frequency resource groups, the processing unit 1402 is configured to perform data transmission with the terminal device based on the transmission status of each of the N time-frequency resource groups and the first time-frequency resource.

For more detailed descriptions of the processing unit 1402 and the transceiver unit 1403, directly refer to the related descriptions in the method embodiment shown in FIG. 2. Details are not described herein again.

As shown in FIG. 15, a communication apparatus 1500 includes a processor 1510 and an interface circuit 1520. The processor 1510 and the interface circuit 1520 are coupled to each other. It may be understood that the interface circuit 1520 may be a transceiver or an input/output interface. Optionally, the communication apparatus 1500 may further include a memory 1530, configured to: store instructions executed by the processor 1510, or store input data required by the processor 1510 to run instructions, or store data generated after the processor 1510 runs instructions.

When the communication apparatus 1500 is configured to implement the method shown in FIG. 2, the processor 1510 is configured to implement a function of the processing unit 1402, and the interface circuit 1520 is configured to implement a function of the transceiver unit 1403.

When the communication apparatus is a chip applied to a terminal device, the terminal device chip implements a function of the terminal device in the foregoing method embodiment. The terminal device chip receives information from another module (such as a radio frequency module or an antenna) in the terminal device, where the information is sent by a network device to the terminal device. Alternatively, the terminal device chip sends information to another module (such as a radio frequency module or an antenna) in the terminal device, where the information is sent by the terminal device to the network device.

When the communication apparatus is a chip applied to the network device, the network device chip implements a function of the network device in the foregoing method embodiment. The network device chip receives information from another module (such as a radio frequency module or an antenna) in the network device, where the information is sent by the terminal device to the network device. Alternatively, the network device chip sends information to another module (such as a radio frequency module or an antenna) in the network device, where the information is sent by the network device to the terminal device.

It should be noted that the processor in embodiments of this application may be a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The general purpose processor may be a microprocessor or any regular processor or the like.

The method steps in the embodiments of this application may be implemented in a hardware manner, or may be implemented in a manner of executing software instructions by the processor. The software instructions may include corresponding software modules, and the software modules may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in the network device or the terminal device. Certainly, the processor and the storage medium may exist in network equipment as discrete components.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The computer-readable storage medium may be any usable medium accessible by the computer, or a data storage device, for example, a server or a data center, integrating one or more usable media. The usable medium may be a magnetic medium, such as a floppy disk, a hard disk, or a magnetic tape, may be an optical medium, such as a digital video disc (DVD), or may be a semiconductor medium, for example, a solid state drive (SSD).

In the embodiments of this application, unless otherwise specified and logically conflicted, terms and/or descriptions in different embodiments are consistent and may be mutually referenced. Technical features in different embodiments may be combined to form a new embodiment based on an internal logical relationship.

In this application, at least one means one or more, and a plurality of means two or more. And/or describes an association relationship between associated objects, and represents that three relationships may exist. For example, A and/or B may represent the following cases: Only A exists, both A and B exist, and only B exists, where A and B may be singular or plural. In the text descriptions of this application, the character "/" generally indicates that associated objects are in an "or" relationship. In the formula of this application, the character "/" indicates that associated objects are in a "division" relationship. In addition, unless stated to the contrary, ordinal numerals such as "first" and "second" mentioned in the embodiments of this application are used to distinguish between a plurality of objects, but are not used to limit an order, a sequence, a priority, or an importance degree of the plurality of objects. In addition, that the objects are necessarily different is not limited in descriptions of "first" and "second".

It may be understood that various numbers in the embodiments of this application are merely used for differentiation for ease of description, and are not used to limit the scope of the embodiments of this application. The sequence numbers of the foregoing processes do not mean the sequence of execution, and a sequence of execution of each process should be determined based on a function and internal logic of the process.

What is claimed is:

1. A communication method, the method comprising:
   determining N time-frequency resource groups, each time-frequency resource group of the N time-frequency resource groups comprises at least one time-frequency resource, and N is a positive integer greater than or equal to 2;
   receiving transmission indication information from a network device, the transmission indication information comprising a bit sequence indicating respective transmission statuses of the N time-frequency resource groups, N bit groups in the bit sequence are in a one-to-one correspondence with the N time-frequency resource groups, and each of the N bit groups comprises at least one bit; and
   performing data transmission with the network device based on a transmission status of each of the N time-frequency resource groups,
   wherein when an $i^{th}$ time-frequency resource group in the N time-frequency resource groups is divided into a first part and a second part, the first and second parts being separated by M first symbols in time domain, and M being a positive integer;
   (a) an $(i-1)^{th}$ bit group in the bit sequence indicates a transmission status of an $(i-1)^{th}$ time-frequency resource group in the N time-frequency resource groups and a transmission status of a time-frequency resource of the first part before the M first symbols in the $i^{th}$ time-frequency resource group following the $(i-1)^{th}$ time-frequency resource group and being adjacent to the $(i-1)^{th}$ time-frequency resource group, and an $i^{th}$ bit group in the bit sequence indicates a transmission status of a time-frequency resource of the second part after the M first symbols in the $i^{th}$ time-frequency resource group, i comprising a positive integer that is: greater than or equal to 2; and less than or equal to N; or
   (b) an $i^{th}$ bit group in the bit sequence indicates a transmission status of a time-frequency resource of the first part before the M first symbols in the $i^{th}$ time-frequency resource group, and an $(i+1)^{th}$ bit group in the bit sequence indicates a transmission status of a time-frequency resource of the second part after the M first symbols in the $i^{th}$ time-frequency resource group and a transmission status of an $(i+1)^{th}$ time-frequency resource group in the N time-frequency resource groups, the $(i+1)^{th}$ time-frequency resource group following the $i^{th}$ time-frequency resource group and being adjacent to the $i^{th}$ time-frequency resource group, wherein i is a positive integer less than or equal to N−1.

2. The method according to claim 1, in case of the feature (a) is selected, wherein when a quantity of symbols of the first part of the $i^{th}$ time-frequency resource group is less than a quantity of symbols of the second part of the $i^{th}$ time-frequency resource group, the $(i-1)^{th}$ bit group in the bit sequence indicates the transmission status of the $(i-1)^{th}$ time-frequency resource group and the transmission status of the time-frequency resource of the first part in the $i^{th}$ time-frequency resource group, and the $i^{th}$ bit group in the bit sequence indicates the transmission status of the time-frequency resource of the second part in the $i^{th}$ time-frequency resource group.

3. The method according to claim 1, in case of the feature (b) is selected, wherein when a quantity of symbols of the first part of the $i^{th}$ time-frequency resource group is greater than or equal to a quantity of symbols of the second part of the $i^{th}$ time-frequency resource group, the $i^{th}$ bit group in the bit sequence indicates the transmission status of the time-frequency resource of the first part in the $i^{th}$ time-frequency resource group, and the $(i+1)^{th}$ bit group in the bit sequence indicates the transmission status of the time-frequency resource of the second part in the $i^{th}$ time-frequency resource group and the transmission status of the $(i+1)^{th}$ time-frequency resource group.

4. The method according to claim 1, wherein M is greater than or equal to a first threshold.

5. The method according to claim 1, wherein when the transmission indication information is used to cancel uplink transmission, the M first symbols are downlink symbols.

6. The method according to claim 1, wherein the method further comprises:
receiving data scheduling information from the network device, the data scheduling information indicating a first time-frequency resource for the data transmission; and
the performing the data transmission with the network device based on a transmission status of each of the N time-frequency resource groups comprises performing the data transmission with the network device based on the transmission status of each of the N time-frequency resource groups and the first time-frequency resource.

7. An apparatus comprising:
a memory storing instructions; and
at least one processor in communication with the memory, the at least one processor configured, upon execution of the instructions, to perform following steps:
determining N time-frequency resource groups, each time-frequency resource group of the N time-frequency resource groups comprises at least one time-frequency resource, and N is a positive integer greater than or equal to 2;
sending transmission indication information to a terminal device, the transmission indication information comprising a bit sequence indicating respective transmission statuses of the N time-frequency resource groups, N bit groups in the bit sequence are in a one-to-one correspondence with the N time-frequency resource groups, and each of the N bit groups comprises at least one bit; and
performing data transmission with the terminal device based on a transmission status of each of the N time-frequency resource groups,
wherein when an $i^{th}$ time-frequency resource group in the N time-frequency resource groups is divided into a first part and a second part, the first and second parts being separated by M first symbols in time domain, and M being a positive integer;
(a) an $(i-1)^{th}$ bit group in the bit sequence indicates a transmission status of an $(i-1)^{th}$ time-frequency resource group in the N time-frequency resource groups and a transmission status of a time-frequency resource of the first part before the M first symbols in the $i^{th}$ time-frequency resource group following the $(i-1)^{th}$ time-frequency resource group and being adjacent to the $(i-1)^{th}$ time-frequency resource group, and an $i^{th}$ bit group in the bit sequence indicates a transmission status of a time-frequency resource of the second part after the M first symbols in the $i^{th}$ time-frequency resource group, i comprising a positive integer that is greater than or equal to 2; and less than or equal to N; or (b) an $i^{th}$ bit group in the bit sequence indicates a transmission status of a time-frequency resource of the first part before the M first symbols in the $i^{th}$ time-frequency resource group, and an $(i+1)^{th}$ bit group in the bit sequence indicates a transmission status of a time-frequency resource of the second part after the M first symbols in the $i^{th}$ time-frequency resource group and a transmission status of an $(i+1)^{th}$ time-frequency resource group in the N time-frequency resource groups, the $(i+1)^{th}$ time-frequency resource group following the $i^{th}$ time-frequency resource group and being adjacent to the $i^{th}$ time-frequency resource group, wherein i is a positive integer less than or equal to N−1.

8. The apparatus according to claim 7, in case of the feature (a) is selected, wherein when a quantity of symbols of the first part of the $i^{th}$ time-frequency resource group is less than a quantity of symbols of the second part of the $i^{th}$ time-frequency resource group, the $(i-1)^{th}$ bit group in the bit sequence indicates the transmission status of the $(i-1)^{th}$ time-frequency resource group and the transmission status of the time-frequency resource of the first part in the $i^{th}$ time-frequency resource group, and the $i^{th}$ bit group in the bit sequence indicates the transmission status of the time-frequency resource of the second part in the $i^{th}$ time-frequency resource group.

9. The apparatus according to claim 7, in case of the feature (b) is selected, wherein when a quantity of symbols of the first part of the $i^{th}$ time-frequency resource group is greater than or equal to a quantity of symbols of the second part of the $i^{th}$ time-frequency resource group, the $i^{th}$ bit group in the bit sequence indicates the transmission status of the time-frequency resource of the first part in the $i^{th}$ time-frequency resource group, and the $(i+1)^{th}$ bit group in the bit sequence indicates the transmission status of the time-frequency resource of the second part in the $i^{th}$ time-frequency resource group and the transmission status of the $(i+1)^{th}$ time-frequency resource group.

10. The apparatus according to claim 7, wherein M is greater than or equal to a first threshold.

11. The apparatus according to claim 7, wherein when the transmission indication information is used to cancel uplink transmission, the M first symbols are downlink symbols.

12. The apparatus according to claim 7, wherein the at least one processor configured, upon execution of the instructions, to further perform following steps:
sending data scheduling information to the terminal device, the data scheduling information indicating a first time-frequency resource for the data transmission; and
the performing the data transmission with the terminal device based on a transmission status of each of the N time-frequency resource groups comprises performing the data transmission with the terminal device based on the transmission status of each of the N time-frequency resource groups and the first time-frequency resource.

13. An apparatus comprising:
a memory storing instructions; and
at least one processor in communication with the memory, the at least one processor configured, upon execution of the instructions, to perform following steps:
  determining N time-frequency resource groups, each time-frequency resource group of the N time-frequency resource groups comprises at least one time-frequency resource, and N is a positive integer greater than or equal to 2;
  receiving transmission indication information from a network device, the transmission indication information comprising a bit sequence used to indicate respective transmission statuses of the N time-frequency resource groups, N bit groups in the bit sequence are in a one-to-one correspondence with the N time-frequency resource groups, and each of the N bit groups comprises at least one bit; and
  performing data transmission with the network device based on a transmission status of each of the N time-frequency resource groups, wherein
  when an $i^{th}$ time-frequency resource group in the N time-frequency resource groups is divided into a first part and a second part, the first and second parts being separated by M first symbols in time domain, and M being a positive integer;
  (a) an $(i-1)^{th}$ bit group in the bit sequence indicates a transmission status of an $(i-1)^{th}$ time-frequency resource group in the N time-frequency resource groups and a transmission status of a time-frequency resource of the first part before the M first symbols in the $i^{th}$ time-frequency resource group, and an $i^{th}$ bit group in the bit sequence indicates a transmission status of a time-frequency resource of the second part after the M first symbols in the $i^{th}$ time-frequency resource group following the $(i-1)^{th}$ time-frequency resource group and being adjacent to the $(i-1)^{th}$ time-frequency resource group, i comprising a positive integer that is: greater than or equal to 2; and less than or equal to N; or
  (b) an $i^{th}$ bit group in the bit sequence indicates a transmission status of a time-frequency resource of the first part before the M first symbols in the $i^{th}$ time-frequency resource group, and an $(i+1)^{th}$ bit group in the bit sequence indicates a transmission status of a time-frequency resource of the second part after the M first symbols in the $i^{th}$ time-frequency resource group and a transmission status of an $(i+1)^{th}$ time-frequency resource group in the N time-frequency resource groups, the $(i+1)^{th}$ time-frequency resource group following the $i^{th}$ time-frequency resource group and being adjacent to the $i^{th}$ time-frequency resource group, wherein i is a positive integer less than or equal to N-1.

14. The apparatus according to claim 13, in case of the feature (a) is selected, wherein when a quantity of symbols of the first part of the $i^{th}$ time-frequency resource group is less than a quantity of symbols of the second part of the $i^{th}$ time-frequency resource group, the $(i-1)^{th}$ bit group in the bit sequence indicates the transmission status of the $(i-1)^{th}$ time-frequency resource group and the transmission status of the time-frequency resource of the first part in the $i^{th}$ time-frequency resource group, and the $i^{th}$ bit group in the bit sequence indicates the transmission status of the time-frequency resource of the second part in the $i^{th}$ time-frequency resource group.

15. The apparatus according to claim 13, in case of the feature (b) is selected, wherein when a quantity of symbols of the first part of the $i^{th}$ time-frequency resource group is greater than or equal to a quantity of symbols of the second part of the $i^{th}$ time-frequency resource group, the $i^{th}$ bit group in the bit sequence indicates the transmission status of the time-frequency resource of the first part in the $i^{th}$ time-frequency resource group, and the $(i+1)^{th}$ bit group in the bit sequence indicates the transmission status of the time-frequency resource of the second part in the $i^{th}$ time-frequency resource group and the transmission status of the $(i+1)^{th}$ time-frequency resource group.

16. The apparatus according to claim 13, wherein M is greater than or equal to a first threshold.

17. The apparatus according to claim 13, wherein when the transmission indication information is used to cancel uplink transmission, the M first symbols are downlink symbols.

18. The apparatus according to claim 13, wherein the at least one processor configured, upon execution of the instructions, to further perform following steps:
  receiving data scheduling information from the network device, the data scheduling information indicating a first time-frequency resource for the data transmission; and
  the performing the data transmission with the network device based on a transmission status of each of the N time-frequency resource groups comprises:
  performing the data transmission with the network device based on the transmission status of each of the N time-frequency resource groups and the first time-frequency resource.

* * * * *